(12) United States Patent
Taguchi

(10) Patent No.: US 8,310,568 B2
(45) Date of Patent: Nov. 13, 2012

(54) CLAMP CONTROL METHOD, CLAMP CORRECTION DEVICE, IMAGE SENSOR, AND ELECTRONIC APPARATUS

(75) Inventor: Hiroyuki Taguchi, Gunma (JP)

(73) Assignee: Sony Corporation, Tokyo (JP)

( * ) Notice: Subject to any disclaimer, the term of this patent is extended or adjusted under 35 U.S.C. 154(b) by 493 days.

(21) Appl. No.: 12/594,972

(22) PCT Filed: Feb. 13, 2009

(86) PCT No.: PCT/JP2009/052362
§ 371 (c)(1),
(2), (4) Date: Oct. 7, 2009

(87) PCT Pub. No.: WO2009/101996
PCT Pub. Date: Aug. 20, 2009

(65) Prior Publication Data
US 2010/0128150 A1     May 27, 2010

(30) Foreign Application Priority Data

Feb. 14, 2008  (JP) ................. 2008-033204
Jan. 27, 2009  (JP) ................. 2009-015286

(51) Int. Cl.
*H04N 9/64*     (2006.01)
*H04N 5/235*    (2006.01)
*H04N 5/335*    (2011.01)
(52) U.S. Cl. .......... 348/243; 348/245; 348/229.1; 348/323; 348/311; 348/316

(58) Field of Classification Search .......... 348/243, 348/245, 229.1, 218.1, 323, 311
See application file for complete search history.

(56) References Cited

U.S. PATENT DOCUMENTS

| | | | |
|---|---|---|---|
| 6,337,713 B1* | 1/2002 | Sato | 348/311 |
| 6,791,615 B1* | 9/2004 | Shiomi et al. | 348/323 |
| 7,050,098 B2 | 5/2006 | Shirakawa et al. | |
| 7,245,318 B2* | 7/2007 | Shirakawa | 348/218.1 |
| 7,358,995 B2 | 4/2008 | Koseki et al. | |
| 2001/0043275 A1 | 11/2001 | Hirota et al. | |
| 2003/0164885 A1 | 9/2003 | Tanaka et al. | |
| 2006/0237721 A1 | 10/2006 | Muramatsu | |
| 2007/0126886 A1 | 6/2007 | Sakurai | |
| 2007/0223069 A1 | 9/2007 | Ota | |

FOREIGN PATENT DOCUMENTS

| | | |
|---|---|---|
| EP | 1 246 453 | 10/2002 |
| JP | 2002-252808 | 9/2002 |

(Continued)

OTHER PUBLICATIONS

European Search Report dated Mar. 26, 2012, in connection with counterpart EP Application No. 09 71 0707.

(Continued)

*Primary Examiner* — Chieh M Fan
*Assistant Examiner* — Quang Le
(74) *Attorney, Agent, or Firm* — SNR Denton US LLP

(57) ABSTRACT

A clamp control method, a clamp correction device, an image sensor, and an electronic apparatus in which high-quality imaging without unnaturalness as a whole can be performed with low power consumption in an image sensor having a large number of pixels.

10 Claims, 15 Drawing Sheets

FOREIGN PATENT DOCUMENTS

| | | |
|---|---|---|
| JP | 2005-176115 | 6/2005 |
| JP | 3697172 | 7/2005 |
| JP | 2007-006538 | 1/2007 |
| JP | 3969190 | 6/2007 |
| JP | 2007-259135 | 10/2007 |
| JP | 2007-306348 | 11/2007 |

OTHER PUBLICATIONS

European Communication Article 94(3), dated Apr. 5, 2012, in connection with counterpart EP Application No. 09 71 0707.

International Search Report dated Jun. 2, 2009.

* cited by examiner

CLAMP CONTROL METHOD, CLAMP CORRECTION DEVICE, IMAGE SENSOR, AND ELECTRONIC APPARATUS

TECHNICAL FIELD

The present invention relates to a clamp control method, a clamp correction device, an image sensor, and an electronic apparatus, and relates to a clamp control method, a clamp correction device, an image sensor, and an electronic apparatus in which a left/right offset can be improved in an image sensor having a relatively large chip size, having a large number of pixels, and stitching exposure being performed thereon.

BACKGROUND ART

CMOS (Complementary Metal Oxide Semiconductor) image sensors having a large chip size and having a large number of pixels of more than ten million have conventionally existed. In such CMOS image sensors, an area to be exposed at a time is limited in a manufacturing process, and thus stitching exposure is performed in twice for the left and right in an ordinary case. At the time, due to variations in manufacturing conditions, it is very difficult to form left and right regions so that they are exactly the same as each other. Accordingly, a difference in dark current occurs between left and right pixel circuits, and as a result, an offset may occur between left and right images.

For example, Patent Document 1 discloses a technique of performing clamp correction by using the following both signals (1) and (2) in order to eliminate an offset difference that occurs between the left and right of an imaging region of a CCD (Charge Coupled Device) or a CMOS image sensor of a CDS (Correlated Double Sampling) method. Signal (1) is a signal of a left/right dummy pixel (a signal independent of a photoelectric converting unit in extra HCCD is adopted). Signal (2) is a signal of a left/right OB pixel (optical black pixel: a light-shielded pixel in which a signal dependent on a photoelectric converting unit is adopted).

However, in the technique according to Patent Document 1, signals (1) and (2) are required to be subtracted from pixel signals in an effective pixel region. Also required are two systems of circuits for the left and right to perform CDS, A/D conversion, OB clamp, and the like. Accordingly, a circuit configuration is complicated and a circuit area increases.

For example, Patent Document 2 discloses a technique of maintaining an OPB (Optical Black) level of an imaging device as a DC level of an image signal at a constant value in accordance with a reference level in a CMOS image sensor of a current output method of outputting a pixel signal as a current signal. Patent Document 2 describes an embodiment in which an OPB region is placed next to a photo sensor area region. Furthermore, Patent Document 2 discloses a technique of feeding back a clamp current to an image signal so that a difference between a detected output level and a predetermined reference voltage value becomes substantially zero.

For example, Patent Document 3 discloses a technique using the following black level correcting method and gain correcting method as a technique for a solid-state imaging device including a CCD. In the black level correcting method, pixel information for a screen read in units of lines is output while being divided for a plurality of channels. The black level of the pixel information read from an image sensor is detected in each channel, and the black level of the pixel information is corrected in each channel. On the other hand, in the gain correcting method, a gain difference between channels of pixel information read from the image sensor is detected, and the gain difference between the channels is corrected. Also, Patent Document 3 discloses a technique capable of performing black level correction independently for left and right channels.

However, in the technique described in Patent Document 3, two channels on the left and right are necessary for output from a horizontal register.

Also, for example, Patent Document 4 discloses the following technique. That is, an OB (OPB) area is provided on both left and right sides of an effective pixel region, which is divided into a plurality of regions. First and second OB signals indicating an optical black level are output from first and second OB areas from image signals output from a plurality of split imaging areas of a solid-state imaging device. Any of those OB signals is subtracted, whereby OB clamp of image signals is performed. Also, Patent Document 4 discloses a technique of calculating an average value of OB signals in respective blocks in each OB area.

However, two channels on the left and right are necessary also in the technique according to Patent Document 4. Furthermore, the technique according to Patent Document 4 adopts a method for subtracting an optical black level in an OB (OPB) region from image signals output from respective split imaging areas on the left and right. Therefore, in the technique according to Patent Document 4, an imaging process in the imaging area is necessary, and the time for calculating a correction value is taken.

In the two-channel method (multi-channel method) adopted in the techniques according to the above-mentioned Patent Documents 1, 3, 4, and the like, a parallel process is performed in a clamp correction process, and thus power consumption cannot be reduced although the processing speed increases. In addition, an image combining process circuit for combining pieces of image data of two channels (multi-channels) into a piece of image data after the correction process is necessary. Furthermore, process circuit elements on the left and right increase due to the two channels for reducing a left/right offset. Accordingly, circuit errors increase due to variations in manufacturing conditions including wiring, so that an offset increases.

Also, as conventional clamp methods used in a CMOS image sensor, there exist a vertical clamp method using vertical OPB and a horizontal clamp method using horizontal OPB. Particularly, in the horizontal clamp method, correction is uniformly performed on the entire effective pixel region for each line even if an OPB value differs in left and right screens. Therefore, the horizontal clamp method is inappropriate for clamp control of performing the above-described stitching exposure.

Patent Document 1: Japanese Patent No. 3697172
Patent Document 2: Japanese Patent No. 3969190
Patent Document 3: Japanese Unexamined Patent Application Publication No. 2002-252808
Patent Document 4: Japanese Unexamined Patent Application Publication No. 2007-6538

DISCLOSURE OF INVENTION

Technical Problem

However, in the image sensor having a relatively large chip size and having a large number of pixels, it is demanded that horizontal clamp control can be easily executed independently for the left and right without complication and that high-quality imaging without unnaturalness as a whole can be performed with low power consumption. However, conventional techniques including Patent Documents 1 to 4 do not sufficiently satisfy the demand under the present circumstances.

The present invention has been made in view of those circumstances. That is, the present invention is directed to enabling easy control of horizontal clamp independently for the left and right without complication and to realizing high-quality imaging without unnaturalness as a whole with low power consumption in an image sensor having a relatively large chip size and having a large number of pixels.

Technical Solution

The present invention is directed to performing a clamp correction process of a black level in a case where an electrophysical characteristic slightly differs in the left and right of a same effective pixel region due to a difference in manufacturing conditions in a CMOS image sensor of a column-parallel AD method. The above-described effective pixel region having a slight difference in electrophysical characteristic is virtually divided into left and right regions, a left horizontal OPB region and a right horizontal OPB region are provided to the left and right of the entire effective pixel region including the left and right regions, data signals are alternately input one row by one to an OPB clamp correction circuit from an input unit in accordance with a predetermined scanning order, a clamp correction value is determined and is given as a lower limit value of a row signal level of the effective pixel region before row scanning of the effective pixel region, and a series of data is internally processed, whereby corrected results can be output from an output unit, and clamp correction can be performed independently for the virtually determined left and right effective pixel regions at high precision in a short time.

The present invention is characterized in that the number of pixels in each row of the respective left and right horizontal OPB regions is quite smaller than the number of pixels in each row of the effective pixel region, that an average value of pixel signals constituting a row of each OPB region is calculated in a short time by an average value calculating circuit in the OPB clamp correction circuit, that a zero correction is performed by subtracting the value, that the value is used as a lower limit value of a black level of a next row in the left and right effective pixel regions defined for convenience, and that clamp correction is sequentially performed in this way on the respective corresponding effective pixel regions to the last row. Also, the present invention considers a case where a defective pixel exists in the OPB region.

Scanning in the horizontal direction is performed in the order of a left OPB region, a left effective pixel region, a right effective pixel region, and a right OPB region; or in the order of the left OPB region, the left effective pixel region, the right OPB region, and the right effective pixel region; or in the order of the left OPB region, the right OPB region, the left effective pixel region, and the right effective pixel region. In the same scanning row, average values of row pixels in the left and right OPB regions are calculated by first and second average value calculating circuits and are held in first and second data holding circuits. The average values are called at scanning of respective next rows, clamp correction is performed so that the values become zero by subtracting the values themselves by a subtracting circuit, and the values are set as lower limit values of a black level of a row in the corresponding effective pixel regions.

In the above-described averaging process, when a defective pixel exists in the OPB region, the OPB value of the pixel has an abnormal value. Thus, a sum of OPB values of pixels is calculated by eliminating this value, and the sum is divided by a value calculated by subtracting the number of defective pixels from the number of all the pixels in a row, whereby an influence of a defective pixel on an OPB average value can be eliminated.

In the above-described process, when all the pixels in a row of the OPB region are defective pixels, the average OPB value of this row is not used in a clamp process, but the latest normal average OPB value held in a data holding circuit (circuit having a storage function, such as a memory) is used instead, whereby clamp correction of the effective pixel region can be performed.

OPB clamp correction is a process of correcting brightness of black (lower limit value of dynamic range) measured in an imaging area by adopting, as a reference value of a signal level, a black in a long and thin region constituted by pixels that have a photoelectric converting unit but that are light-shielded outside an imaging area of an image sensor. In an ordinary case, a black level measured in the imaging area is a little higher than a black level in the OPB region, and thus a dynamic range from white to black in the imaging area is slight narrower than a design value. Therefore, a correction process of extending the dynamic range of the imaging area using a black level value in the OPB region is necessary. The CMOS image sensor of the column-parallel AD method is mainly characterized in that signal processing of subtracting a signal level of the OPB region from pixel signals in the effective pixel region is not performed unlike in the CCD image sensor, and that a lower limit value of black in the effective pixel region is set after a lower limit value of black in the OPB region is set.

Additionally, the lowest limit value of black in the OPB region is slightly floating from black in theory (zero level) in an ordinary case. Thus, in a case of performing clamp correction on respective rows in the effective pixel region by using OPB values of respective rows in the OPB region as in the present invention, for example, by measuring a difference value from zero for each pixel and each row in the OPB region, it is necessary to perform a clamp correction process by supplying a value to a row in the effective pixel region so that a floating amount (difference value) of the preceding row becomes zero.

Furthermore, due to variations in manufacturing conditions, a lower limit value of a black level slightly varies in upper and lower or left and right portions in the effective pixel region even in the same image sensor chip. Thus, OPB regions corresponding to those regions are necessary, and clamp correction needs to be executed for each row on the respective entire effective pixel regions.

Advantageous Effects

As described above, according to the present invention, control of horizontal clamp can be easily realized independently for the left and right without complication in an image sensor having a relatively large chip size and a large number of pixels, so that high-quality imaging without unnaturalness as a whole can be realized with low power consumption.

Figure 1:
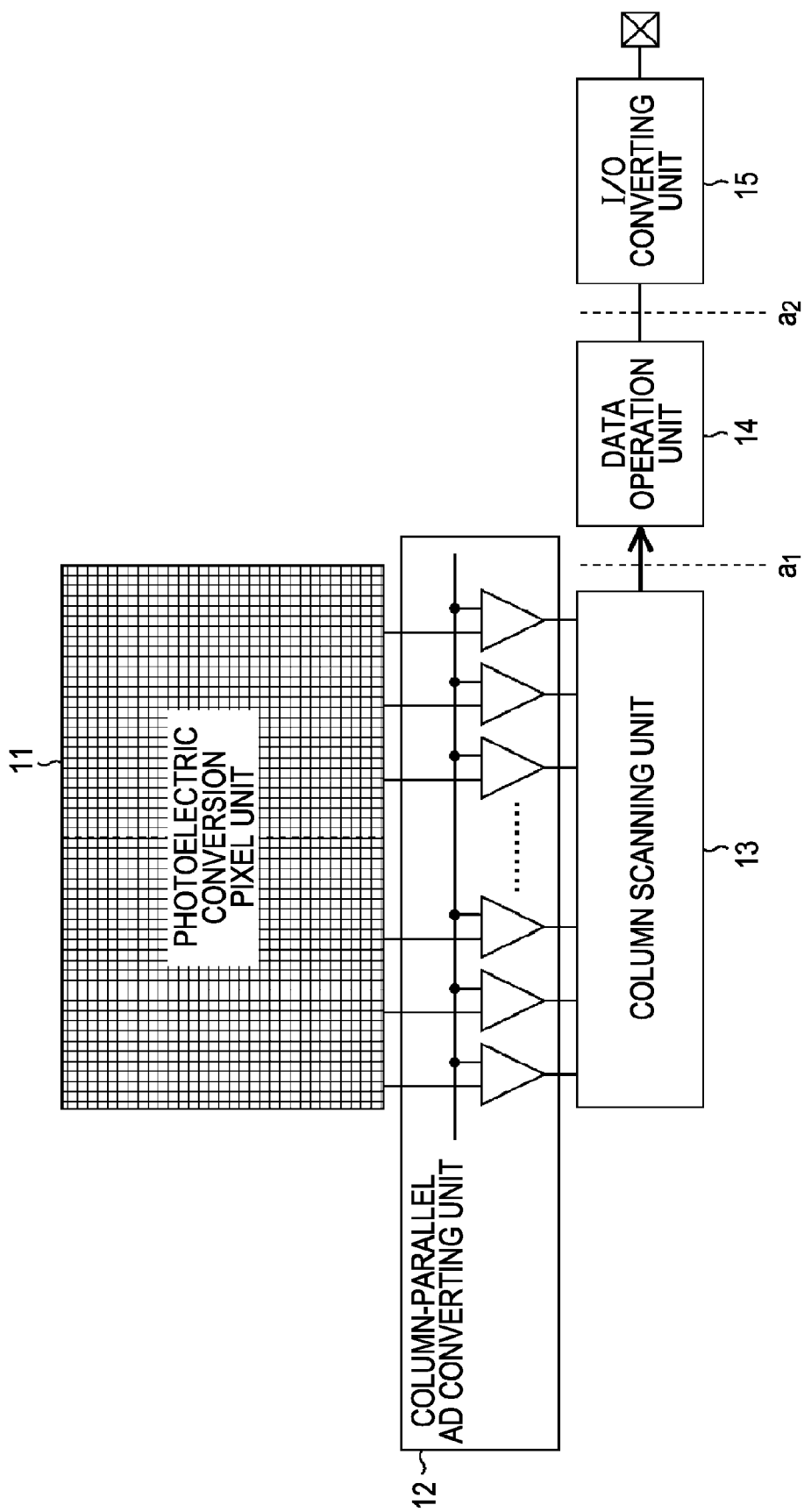
FIG. 1 is a diagram illustrating a configuration example of a main part of an entire configuration of a CMOS image sensor of a column-parallel AD method including a left/right-independent OPB clamp correction unit to which the present invention is applied.

EXPLANATION OF REFERENCE NUMERALS 11 photoelectric conversion pixel unit, 12 column-parallel AD converting unit, 13 column scanning unit, 14 data operation unit, 15 I/O converting unit, 21 selector unit, 22 control signal output unit, 23 data holding unit, 24 clamp correction unit, and 25 adding unit

BEST MODES FOR CARRYING OUT THE INVENTION

Hereinafter, an embodiment of the present invention is described with reference to the drawings.

Figure 2:
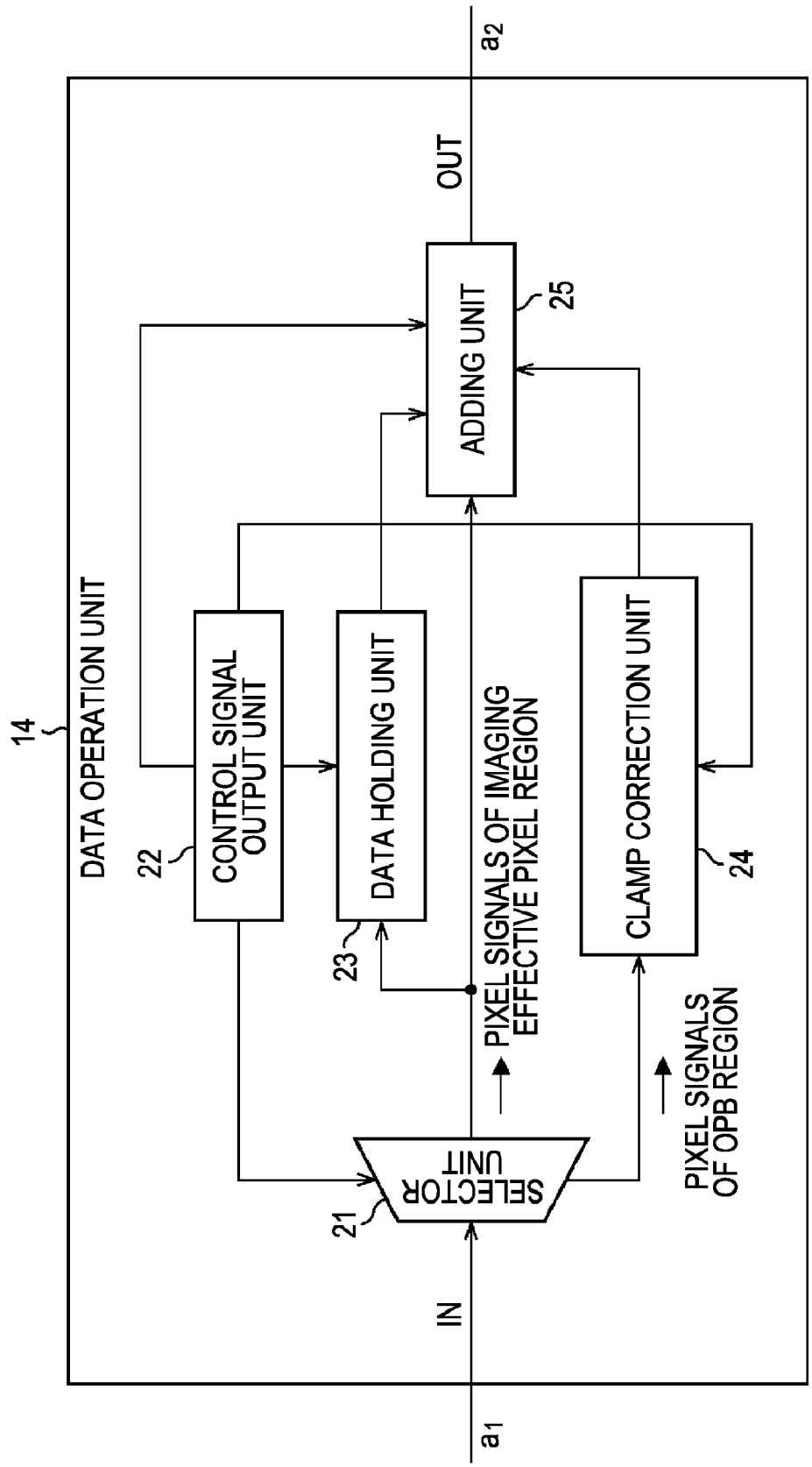
FIG. 2 is a diagram illustrating a configuration example of a data operation unit in FIG. 1.

FIGS. 1 and 2 illustrate configuration examples of a clamp system in a CMOS image sensor of a column-parallel AD method to which the present invention is applied.

That is, FIG. 1 illustrates a configuration example of a main part of an entire configuration of a CMOS image sensor of the column-parallel AD method including a left/right-independent OPB clamp correction unit to which the present invention is applied.

The entire CMOS image sensor is configured to include a photoelectric conversion pixel unit 11, a column-parallel AD converting unit 12, a column scanning unit 13, a data operation unit 14 including a clamp circuit and the like, and an I/O converting unit 15.

The data operation unit 14 including a clamp circuit and the like to which the present invention is applied is placed in a subsequent stage of the column-parallel AD converting unit 12, between the column scanning unit 13 and the I/O converting unit 15.

FIG. 2 illustrates a configuration example of the data operation unit 14 shown between a1 and a2 in FIG. 1 in the viewpoint of a flow of signal data.

The data operation unit 14 is configured to include a selector unit 21, a control signal output unit 22, a data holding unit 23, a clamp correction unit 24, and an adding unit 25.

The data operation unit 14 in the example in FIG. 2 has a configuration of constantly holding data of the preceding row and calling the data as necessary, for example.

Now, conventional clamp methods are described for easy understanding of the present invention.

Figure 3:
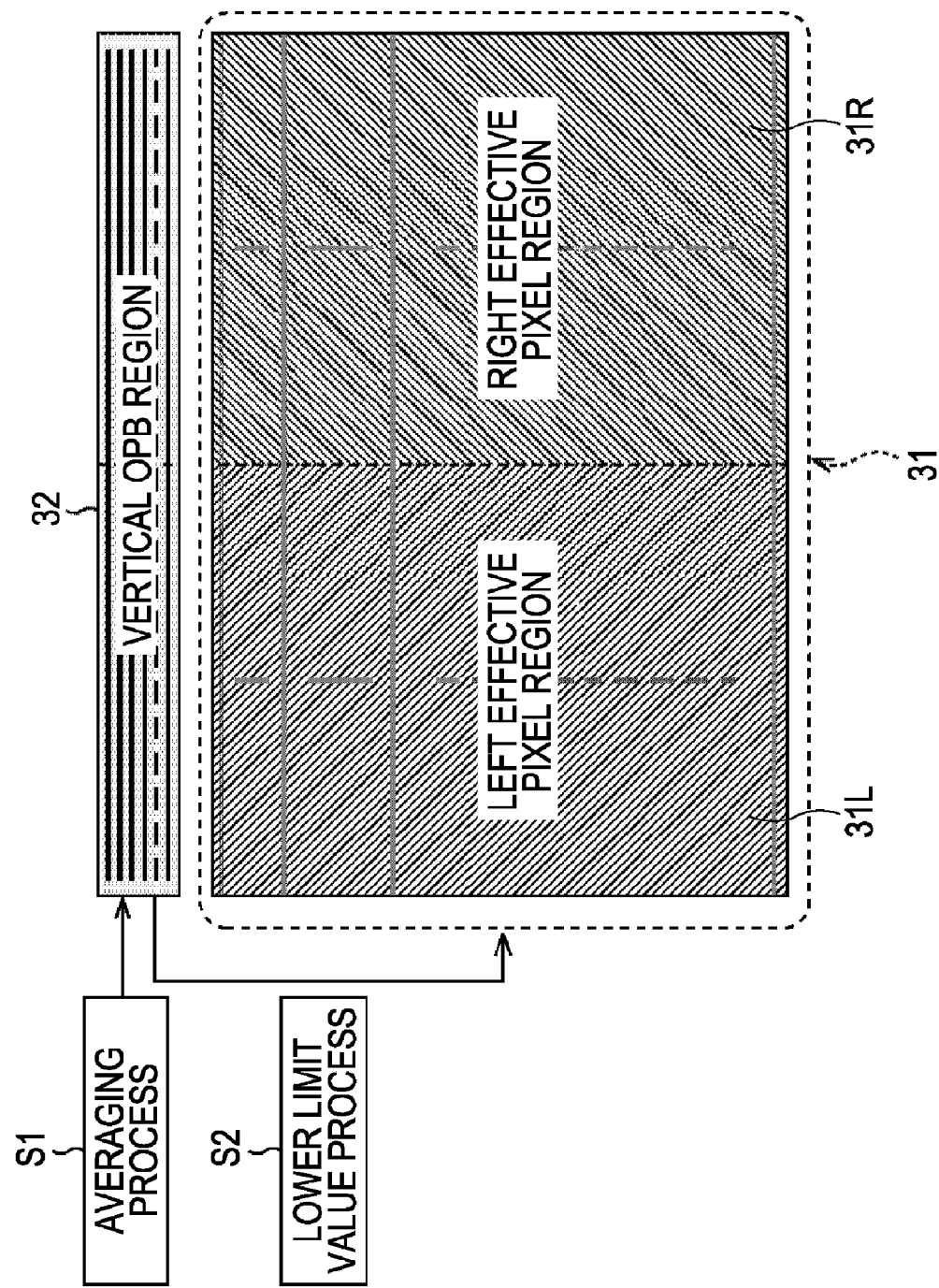
FIG. 3 is a diagram illustrating a method for clamp correction of a vertical OPB method among conventional clamp methods.

FIG. 3 is a diagram illustrating a vertical clamp method based on a vertical OPB method among conventional clamp methods.

It is assumed that the image sensor illustrated in FIG. 3 is a CMOS image sensor of the column-parallel AD method, the image sensor having a relatively large chip size, having a large number of pixels, and left/right stitching exposure being performed thereon. In the image sensor in FIG. 3, a long and thin vertical OPB region 32 is placed along a horizontal direction above or below (above in the example in FIG. 3) an entire effective pixel region 31. Additionally, in the image sensor in FIG. 3, the electrophysical characteristics on the left and right are not at all the same. Therefore, the effective pixel region 31 is virtually divided into two left effective pixel region 31L and right effective pixel region 31R on the left and right.

The conventional vertical clamp method is a method including an averaging process in step S1 and a lower limit value process in S2 described below. The averaging process in step S1 is a process of detecting individual OPB values of pixels in the vertical OPB region 32, calculating a sum of the OPB values in the entire vertical OPB region 32, and obtaining an average value by dividing the sum by a total number of pixels in the region. The lower limit value process in step S2 is a process of zero-correcting the average value obtained in the averaging process in step S1 and setting the corrected value as a lower limit value of a black level in the entire effective pixel region 31 placed below the vertical OPB region 32.

In other words, the averaging process in step S1 is a process of averaging the OPB values of all the pixels in the vertical OPB region 32 and sets the average value as an OPB value of the entire vertical OPB region. On the other hand, the lower limit value process in step S2 is a process of applying the value as a lower limit value of a black level in the entire screen of the effective pixel region 31.

Such a conventional vertical clamp method has a disadvantage of being incapable of executing a clamp correction process independently for the above-described vertical left and right effective pixel regions (left effective pixel region 31L and right effective pixel region 31R in the example in FIG. 3).

Figure 4:
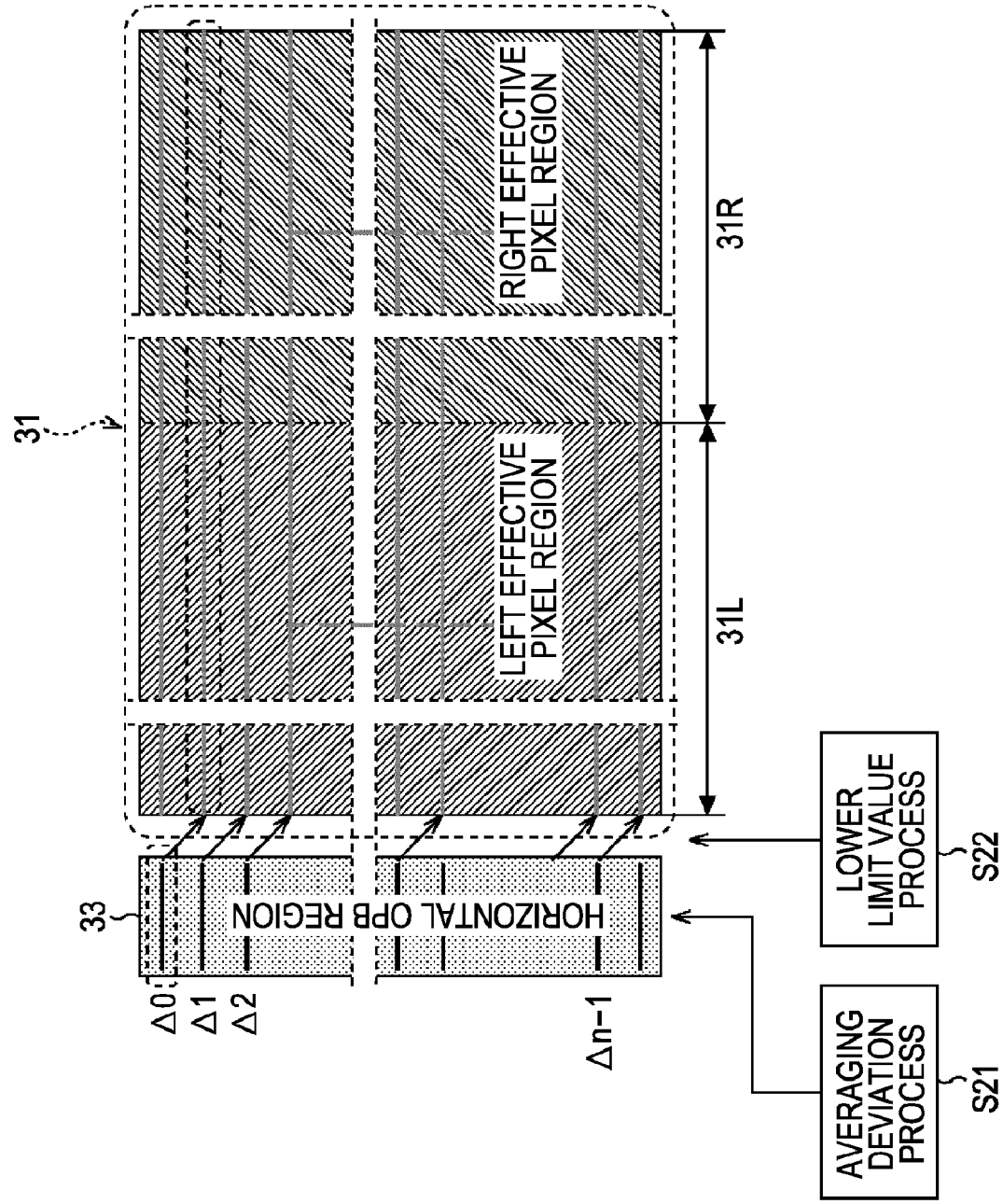
FIG. 4 is a diagram illustrating a method for clamp correction of a horizontal OPB method among conventional clamp methods.

Also, FIG. 4 is a diagram illustrating a horizontal clamp method based on a horizontal OPB method among the conventional clamp methods.

The sensor in FIG. 4 is also a CMOS sensor that is basically the same as the sensor in FIG. 3. Note that, in the sensor in FIG. 4, a long and thin horizontal OPB region 33 is provided along a vertical direction on any of left and right sides (left side in the example in FIG. 4) of the effective pixel region 31. The conventional horizontal clamp method in FIG. 4 is a method of performing clamp correction on the entire effective pixel region 31 one row after another by ignoring unbalanced characteristics on the left and right. Therefore, the conventional horizontal clamp method in FIG. 4 is capable of executing a finer clamp correction compared to the conventional vertical clamp method in FIG. 3. However, the conventional horizontal clamp method in FIG. 4 is incapable of performing a correct clamp correction when a difference in physical characteristic exists between the left and right, and as a result, an offset may occur between left and right images.

The conventional horizontal clamp method is a method including repetition of an averaging deviation process in step S21 and a lower limit value process in S22 described below.

That is, the averaging deviation process in the first-time step S21 is a process of calculating an average value by dividing a sum of pixel signals in the first row in the horizontal OPB region 33 by the number of pixels and obtaining a difference value Δ0 from a reference value at the first horizontal scanning. Meanwhile, the lower limit value process in the first-time step S22 is a process of holding the value until next scanning without reflecting it on the row of the effective pixel region in the same scanning period and supplying the value to set the lower limit value of a signal level in the next row in the effective pixel region 31 such that the value becomes zero.

Thereafter, in the averaging deviation processes in respective steps S21, difference values Δ1, Δ2, Δ3, ..., and Δn−1 are obtained for the respective rows in the horizontal OPB region 33 in the same manner. Then, in the lower limit value processes in respective steps S22, those values are supplied to the respective rows in the effective pixel region 31 such that the values are constantly zero.

That is, the averaging deviation process in step S21 is a process of averaging OPB values of row pixels in the horizontal OPB region 33, setting the average value as an OPB value of the row, and obtaining a difference value Δ with respect to the reference value of the OPB value in this row. The lower limit value process in step S22 is a process of obtaining zero by subtracting the difference value Δ from the difference value Δ and applying zero as the OPB value of the next row in the effective pixel region 31.

Hereinafter, respective examples of a clamp method to which the present invention is applied (hereinafter referred to as examples of the present invention) are described in comparison to the foregoing conventional clamp methods.

Figure 5:
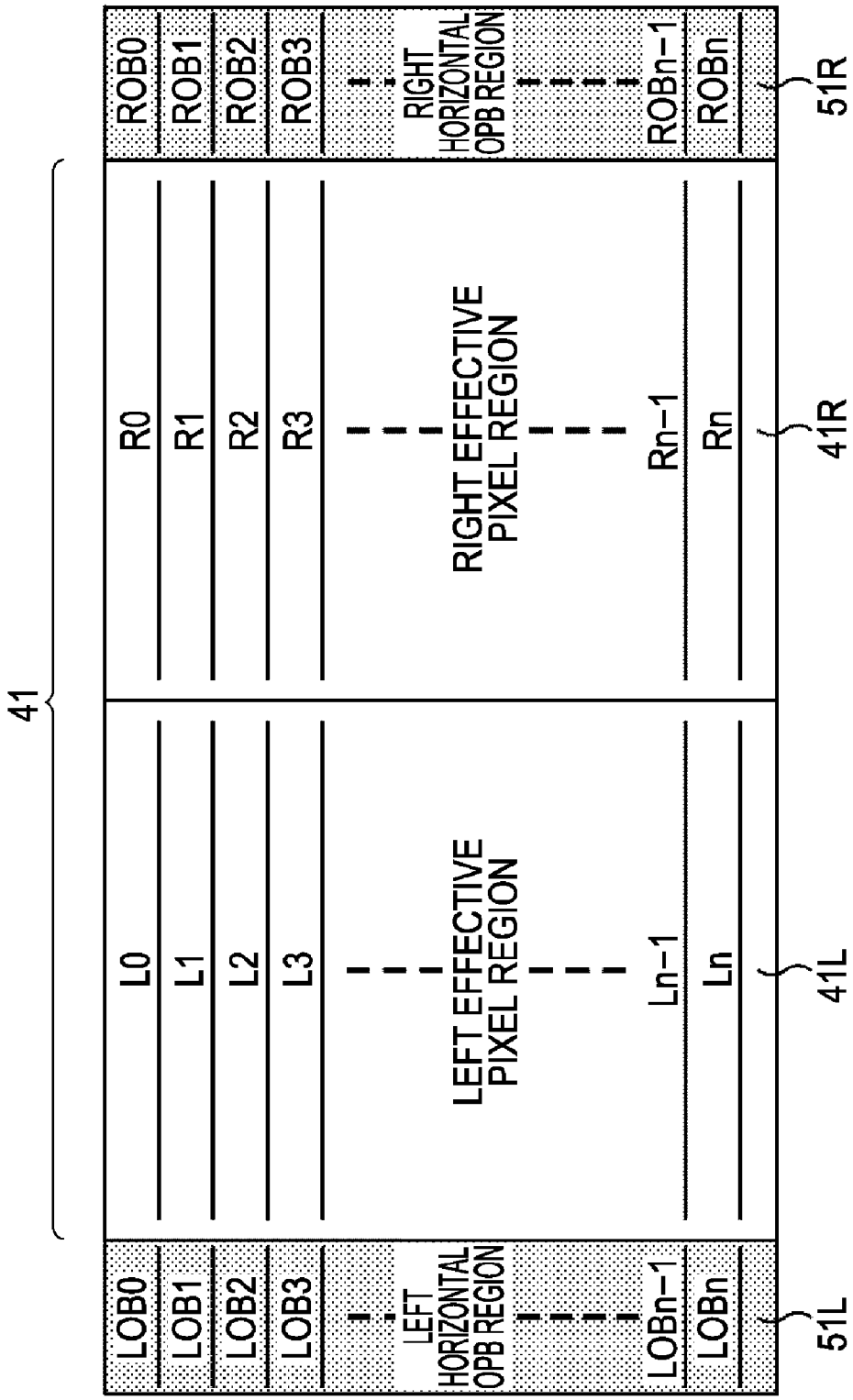
FIG. 5 is a diagram illustrating a concept of a left/right-independent clamp control method as example 1 of the present invention and is an enlarged view of a photoelectric conversion pixel unit based on a left/right-independent clamp method using horizontal OPB.

FIG. 5 is a diagram illustrating a concept of a left/right-independent clamp control method according to example 1 of the present invention, and is an enlarged view of a pixel unit based on the left/right-independent clamp method using horizontal OPB.

That is, FIG. 5 illustrates a configuration example of the photoelectric conversion pixel unit 11 in a case where example 1 of the present invention (example 1 of the left/right-independent clamp method) is applied.

As illustrated in FIG. 5, in the photoelectric conversion pixel unit 11, an effective pixel region 41 is divided into a left effective pixel region 41L and a right effective pixel region 41R in n+1 rows (n is an integer value of 1 or more). Furthermore, a left horizontal OPB region 51L functions for clamp correction of the left effective pixel region 41L, and a right horizontal OPB region 51R functions for clamp correction of the right effective pixel region 41R. The left horizontal OPB region 51L is constituted by rows L0B0 to L0Bn, the right horizontal OPB region 51R is constituted by rows R0B0 to R0Bn, the left effective pixel region 41L is constituted by rows L0 to Ln, and the right effective pixel region 41R is constituted by rows R0 to Rn.

Figure 6:
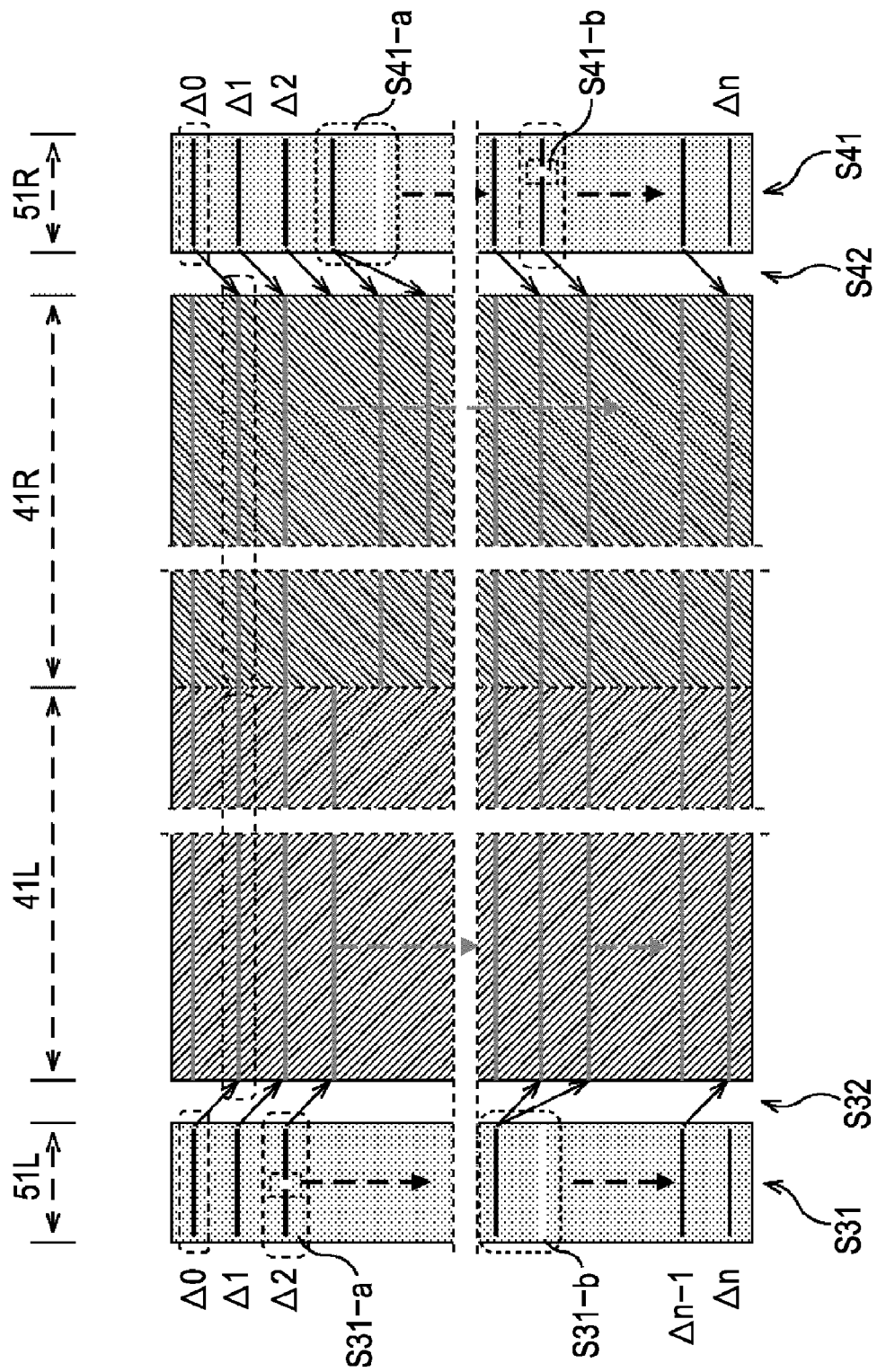
FIG. 6 is a diagram illustrating an operation in a case where a point defect (defective pixel) exists in example 1 of the present invention in FIG. 5, that is, in operations of example 1 of the left/right-independent clamp control method.

FIG. 6 is a diagram illustrating an operation example in a case where a point defect (defective pixel) exists in operations according to example 1 of the present invention illustrated in FIG. 5, that is, example 1 of the left/right-independent clamp control method.

In step S31, the clamp correction unit 24 averages OPB values of pixels included in a target row, each of the rows L0B0 to L0Bn in the left horizontal OPB region 51L sequentially being the target row (the process so far is called an averaging process). The clamp correction unit 24 sets the average value as an OPB value of the target row and obtains a difference value Δ with respect to the reference value (e.g., zero) of the OPB value in the target row.

In step S32, the clamp correction unit 24 sets the difference value Δ as the OPB value of the next row (row next to the target row) in the left effective pixel region 41L.

However, in a case where one or some of the pixels in the target row are defective pixels, the following process in step S31-a is executed as the averaging process in step S31. That is, in step S31-a, the clamp correction unit 24 averages OPB values of pixels except the defective pixel(s) among the pixels included in the target row.

On the other hand, in a case where all the pixels in the target row are defective pixels, the following process in step S31-b is executed as the averaging process in step S31. That is, in step S31-b, the clamp correction unit 24 adopts, as an OPB value (average value) of the target row, a normal OPB value in the preceding row instead of the target row.

Also, in step S41, the clamp correction unit 24 executes an averaging process. That is, the clamp correction unit 24 averages OPB values of pixels included in a target row, each of the rows R0B0 to R0Bn in the right horizontal OPB region 51R sequentially being the target row. The clamp correction unit 24 sets the average value as an OPB value of the target row and obtains a difference value Δ with respect to the reference value (e.g., zero) of the OPB value in the target row.

In step S42, the clamp correction unit 24 sets the difference value Δ as the OPB value of the next row (row next to the target row) in the right effective pixel region 41R.

However, in a case where one or some of the pixels in the target row are defective pixels, the following process in step S41-a is executed as the averaging process in step S41. That is, in step S41-a, the clamp correction unit 24 averages OPB values of pixels except the defective pixel(s) among the pixels included in the target row.

On the other hand, in a case where all the pixels in the target row are defective pixels, the following process in step S41-b is executed as the averaging process in step S41. That is, in step S41-b, the clamp correction unit 24 adopts, as an OPB value (average value) of the target row, a normal OPB value in the preceding row instead of the target row.

The foregoing processes in steps S31 and S32 (S31-a or S31-b as necessary) and processes in steps S41 and S42 (S41-a or S41-b as necessary) are repeatedly executed for the rows to the last row.

In this case, the order of horizontal scanning is not particularly limited. For example, an order of the left horizontal OPB region 51L→the left effective pixel region 41L→the right effective pixel region 41R→the right horizontal OPB region 51R can be adopted. Also, for example, an order of the left horizontal OPB region 51L→the right horizontal OPB region 51R→the left effective pixel region 41L→the right effective pixel region 41R can be adopted. Additionally, regarding the vertical direction, the entire region is scanned from the top to the bottom.

As conclusion, the horizontal clamp correction method based on example 1 of the present invention includes the following series of processes. That is, in step S31, the clamp correction unit 24 calculates, by a first average value calculating unit (e.g., an average value calculating unit 76 in FIG. 13), a difference value Δ of row pixels in the same scanning row (target row) in the left horizontal OPB region 51L. The difference value Δ is held in a first data holding unit (e.g., a data holding unit 78L in FIG. 13). At the scanning of respective next rows, in step S32, the clamp correction unit 24 calls the difference value Δ from the first data holding unit and performs clamp correction so that the value becomes zero (or approximately zero) by subtracting the difference value from the difference value itself by a subtracting unit (e.g., the subtracting unit 80 in FIG. 13). The clamp correction unit 24 sets the correction value as a lower limit value of a black level of a corresponding row (row next to the target row) in the left effective pixel region 41L.

On the other hand, in step S41, the clamp correction unit 24 calculates, by a second average value calculating unit (e.g., an average value calculating unit 76R in FIG. 13), a difference value Δ of row pixels in the same scanning row (target row) in the right horizontal OPB region 51R. The difference value Δ is held in a second data holding unit (e.g., a data holding unit 78R in FIG. 13). At the scanning of respective next rows, in step S42, the clamp correction unit 24 calls the difference value Δ from the second data holding unit and performs clamp correction so that the value becomes zero by subtracting the difference value itself by the subtracting unit (e.g., the subtracting unit 80 in FIG. 13). The clamp correction unit 24 sets the correction value as a lower limit value of a black level of a corresponding row (row next to the target row) in the right effective pixel region 41R.

As described above, in example 1 of the present invention (example 1 of the left/right-independent clamp method), clamp correction can be executed independently for each of the left and right effective pixel regions (left effective pixel region 41L and right effective pixel region 41R in the example in FIG. 6)

Additionally, in a case where a defective pixel exists in the left horizontal OPB region 51L or the right horizontal OPB region 51R, the OPB value of the pixel exhibits an abnormal value during the averaging process in step S31 or S41.

In that case, step S31-a or S41-a, or step S31-b or S41-b is executed to eliminate an influence of the value of the defective pixel.

For example, in a case where one or some of the pixels in the target row are defective pixels, the following process is executed as a process in step S31-a or S41-a. A process of calculating a sum of OPB values of pixels in the target row by eliminating the OPB value(s) of the defective pixel(s), and then dividing the sum by a value obtained by subtracting the number of defective pixels from the number of all pixels in the target row is executed. Accordingly, an influence of the defective pixel(s) on the OPB average value is eliminated.

Also, for example, in a case where all the pixels in the target row are defective pixels, the following process is executed as a process in step S31-b or S41-b. An averaged OPB value of the target row is not used for a clamp process, and instead, the nearest normal averaged OPB value held in a data holding circuit (a circuit having a storage function such as a memory, e.g., the data holding unit 78L or 78R in FIG. 13) is adopted as an OPB value of the target row. In other words, for example, update of the data holding unit 78L is not performed. Accordingly, in the subsequent process in step S32 or S42, a process of performing row clamp correction in the effective pixel region so that the difference value becomes zero by using the value is executed.

Figure 7:
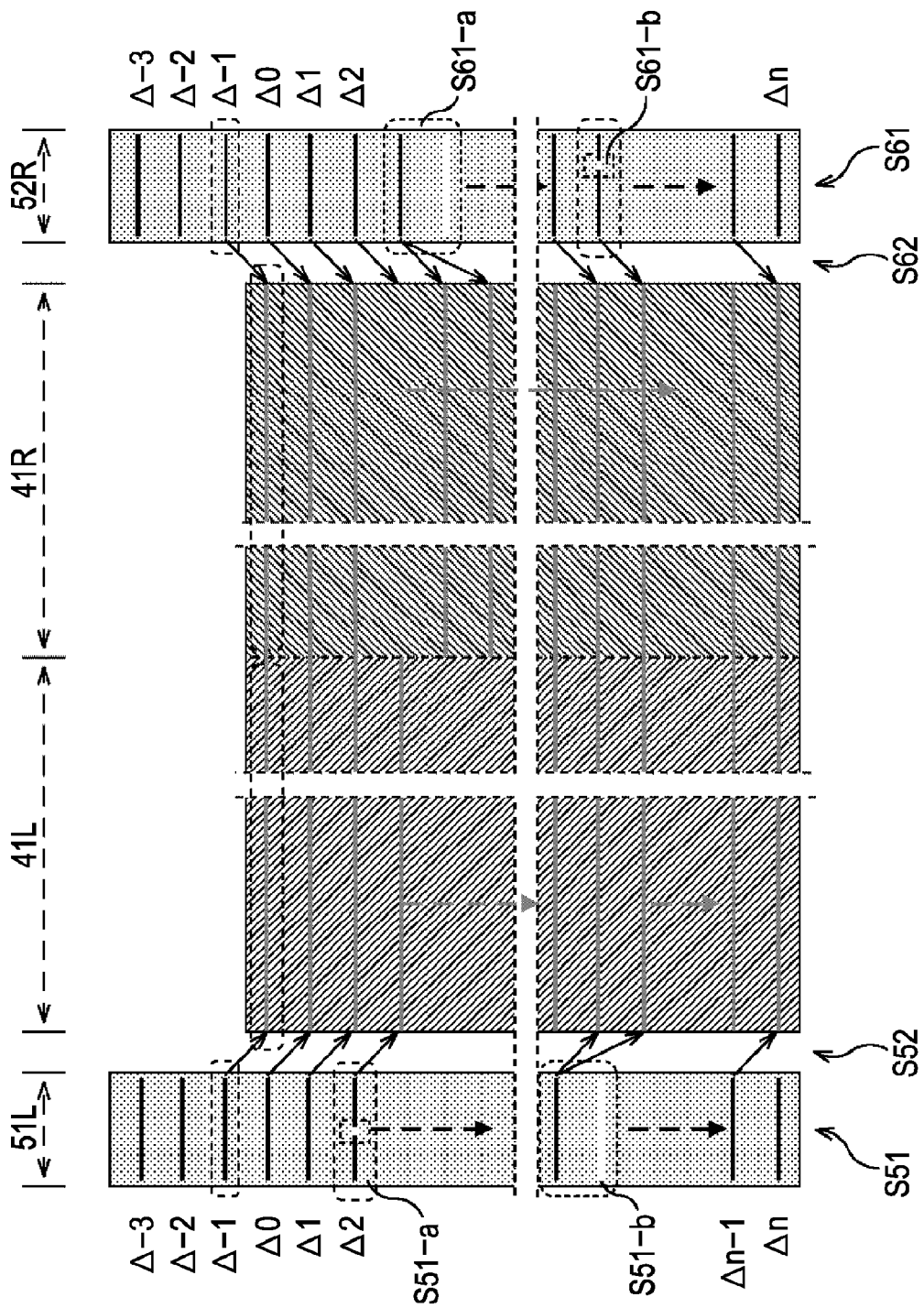
FIG. 7 is a diagram illustrating an example different from that in FIG. 6 in example 1 of the present invention, that is, an example in a case where the number of scanning lines in an OPB region is larger than the number of horizontal scanning lines in an effective pixel region.

FIG. 7 illustrates an example difference from that in FIG. 6 in example 1 of the present invention, that is, an operation example in a case where the number of scanning lines in an OPB region is larger than the number of horizontal scanning lines in an effective pixel region. In the case of the example in FIG. 7, clamp correction can be executed from the first row in the effective pixel region.

In FIG. 7, the left horizontal OPB region 51L and the right horizontal OPB region 51R have scanning lines the number of which is larger than the number of horizontal scanning lines in the effective pixel region 41.

In step S51, a process of averaging OPB values of pixels included in a target row, the respective rows in the left horizontal OPB region 51L sequentially being the target row, is executed, that is, an averaging process is executed. The clamp correction unit 24 sets the average value as an OPB value of the target row and obtains a difference value Δ with respect to the reference value (e.g., zero) of the OPB value in the target row.

In step S52, the clamp correction unit 24 sets the difference value Δ as the OPB value of the next row (row next to the target row) in the left effective pixel region 41L.

However, in a case where one or some of the pixels in the target row are defective pixels, the following process in step S51-a is executed as the averaging process in step S51. That is, in step S51-a, the clamp correction unit 24 averages OPB values of pixels except the defective pixel(s) among the pixels included in the target row.

On the other hand, in a case where all the pixels in the target row are defective pixels, the following process in step S51-b is executed as the averaging process in step S51. That is, in step S51-b, the clamp correction unit 24 adopts, as an OPB value (average value) of the target row, a normal OPB value in the preceding row instead of the target row.

Also, in step S61, the clamp correction unit 24 executes an averaging process. That is, the clamp correction unit 24 averages OPB values of pixels included in a target row, each of the rows in the right horizontal OPB region 51R sequentially being the target row. The clamp correction unit 24 sets the average value as an OPB value of the target row and obtains a difference value Δ with respect to the reference value (e.g., zero) of the OPB value in the target row.

In step S62, the clamp correction unit 24 sets the difference value Δ as the OPB value of the next row (row next to the target row) in the right effective pixel region 41R.

However, in a case where one or some of the pixels in the target row are defective pixels, the following process in step S61-a is executed as the averaging process in step S61. That is, in step S61-a, the clamp correction unit 24 averages OPB values of pixels except the defective pixel(s) among the pixels included in the target row.

On the other hand, in a case where all the pixels in the target row are defective pixels, the following process in step S61-b is executed as the averaging process in step S61. That is, in step S61-b, the clamp correction unit 24 adopts, as an OPB value (average value) of the target row, a normal OPB value in the preceding row instead of the target row.

The foregoing processes in steps S51 and S52 (S51-a or S51-b as necessary) and processes in steps S61 and S62 (S61-a or S61-b as necessary) are repeatedly executed for the rows to the last row.

Figure 8:
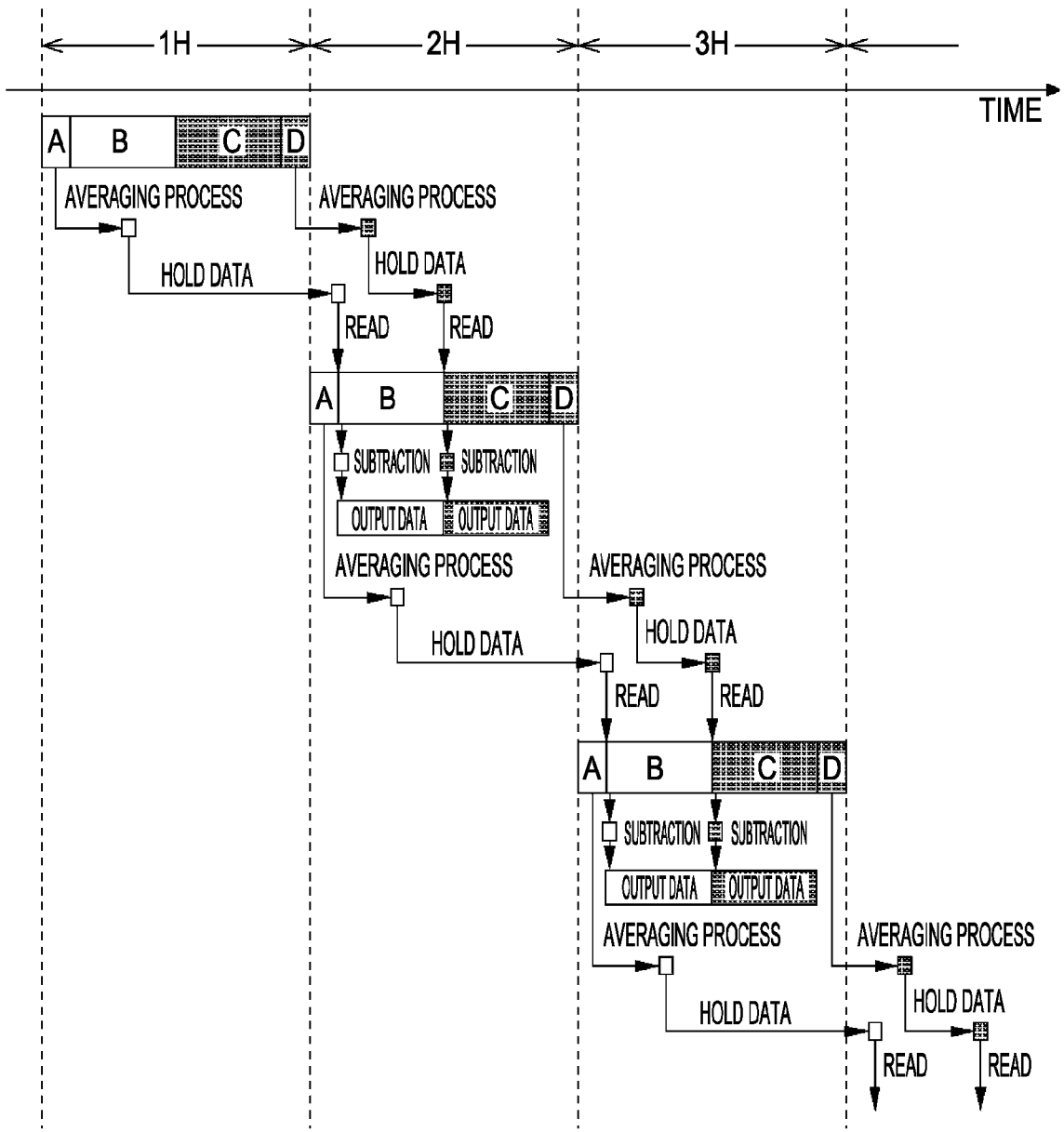
FIG. 8 is a timing chart of an example of data processing according to the present invention.

FIG. 8 is a timing chart illustrating an example of data processing according to the present invention and illustrating how data processing for horizontal clamp correction is performed over time.

Specifically, in the example in FIG. 8, the scanning order in the horizontal direction is the left horizontal OPB region 51L→the left effective pixel region 41L→the right effective pixel region 41R→the right horizontal OPB region 51R. That is, in FIG. 8, a period A indicates a left horizontal OPB scanning period, a period B indicates a left effective pixel region scanning period, a period C indicates a right effective pixel region scanning period, and a period D indicates a right horizontal OPB scanning period.

"Averaging process" in FIG. 8 corresponds to the process in step S31 (including step S31-a or S31-b as necessary) or step S41 (including step S41-a or S41-b as necessary) in the example in FIG. 6. Also, in the example in FIG. 7, step S51 (including step S51-a or S51-b as necessary) or step S61 (including step S61-a or S61-b as necessary) corresponds to "averaging process" in FIG. 8.

Furthermore, a series of processes "read"→"subtraction"→"output data" in FIG. 8 correspond to the process in step S32 or S42 in the example in FIG. 6, and correspond to the process in step S52 or S62 in the example in FIG. 7.

In the case of the example in FIG. 8, "averaging process time+data holding time" of the left horizontal OPB region 51L is not equal to "averaging process time+data holding time" of the right horizontal OPB region 51R. However, since a vertical scanning time is longer than a horizontal scanning time, the above-described clamp correction can be performed.

In the case of the example in FIG. 8, the averaging process in the period A and the averaging process in the period D are executed in different times without overlapping with each other in time series. Therefore, if pieces of data after the averaging processes are immediately held in the data holding circuit, the same averaging process circuit can be used for the averaging process in the period A and the averaging process in the period D. Therefore, only one averaging process circuit is necessary, as an average value calculating unit 76 illustrated in FIG. 12 described below.

Figure 9:
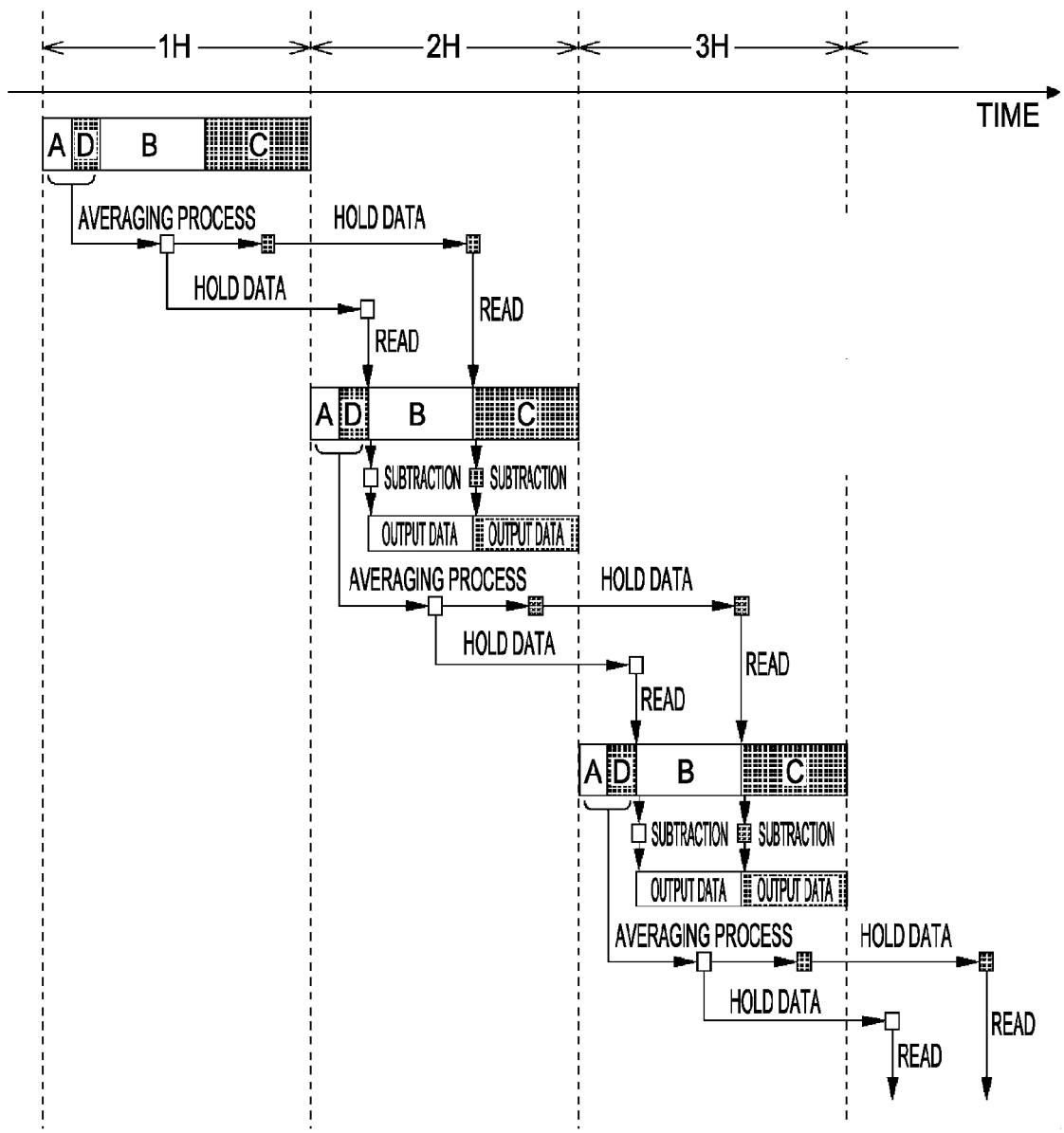
FIG. 9 is a timing chart of another example of data processing according to the present invention.

FIG. 9 is a timing chart illustrating an example of data processing according to the present invention different from the example in FIG. 8 and illustrating how data processing for horizontal clamp correction is performed over time.

Specifically, in the example in FIG. 9, the scanning order in the horizontal direction is the left horizontal OPB region 51L→the right horizontal OPB region 51R→the left effective pixel region 41L→the right effective pixel region 41R. That is, in FIG. 9, a period A indicates a left horizontal OPB scanning period, a period D indicates a right horizontal OPB scanning period, a period B indicates a left effective pixel region scanning period, and a period C indicates a right effective pixel region scanning period.

In the case of the example in FIG. 9, "averaging process time+data holding time" of the left horizontal OPB region 51L is equal to "averaging process time+data holding time" of the right horizontal OPB region 51R.

In the case of the example in FIG. 9, too, the averaging process in the period A and the averaging process in the period D are executed in different times without overlapping with each other in time series. Therefore, if pieces of data after the averaging processes are immediately held in the data holding circuit, the same averaging process circuit can be used for the averaging process in the period A and the averaging process in the period D. Therefore, only one averaging process circuit is necessary, as the average value calculating unit 76 illustrated in FIG. 12 described below.

Figure 10:
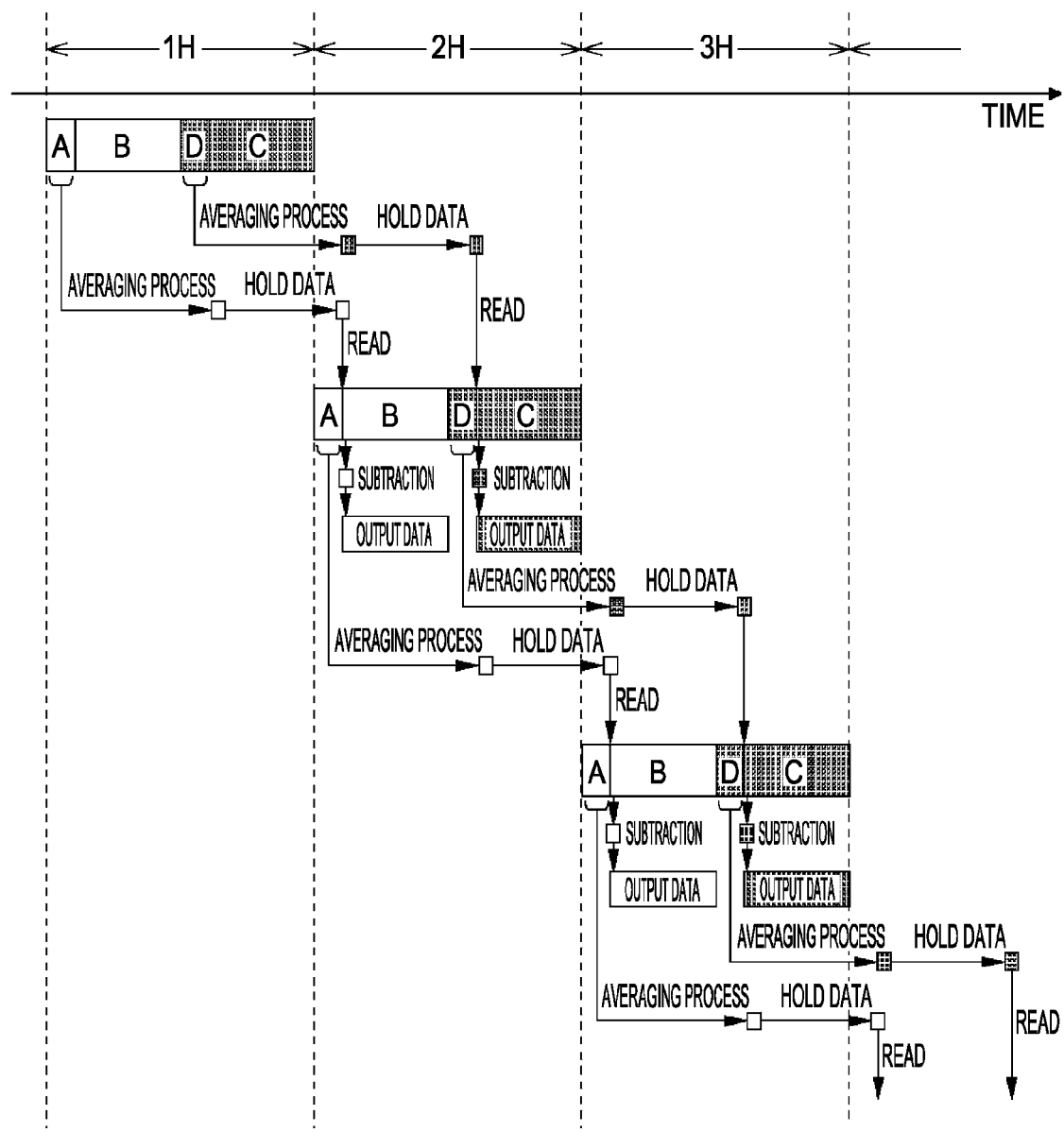
FIG. 10 is a timing chart of still another example of data processing according to the present invention.

FIG. 10 is a timing chart illustrating an example of data processing according to the present invention different from the examples in FIGS. 8 and 9 and illustrating how data processing for horizontal clamp correction is performed over time.

Specifically, in the example in FIG. 10, the scanning order in the horizontal direction is the left horizontal OPB region 51L→the left effective pixel region 41L→the right horizontal OPB region 51R→the right effective pixel region 41R. That is, in FIG. 10, a period A indicates a left horizontal OPB scanning period, a period B indicates a left effective pixel region scanning period, a period D indicates a right horizontal OPB scanning period, and period C indicates a right effective pixel region scanning period.

In the case of the example in FIG. 10, "averaging process time+data holding time" of the left horizontal OPB region 51L is equal to "averaging process time+data holding time" of the right horizontal OPB region 51R.

As can be understood from the foregoing examples in FIGS. 8 to 10, the averaging process on the row pixels in the left OPB region 51L and the right OPB region 51R should be ended before clamp correction of the row in the left effective pixel region 41L and the right effective pixel region 41R corresponding to the next scanning.

Figure 11:
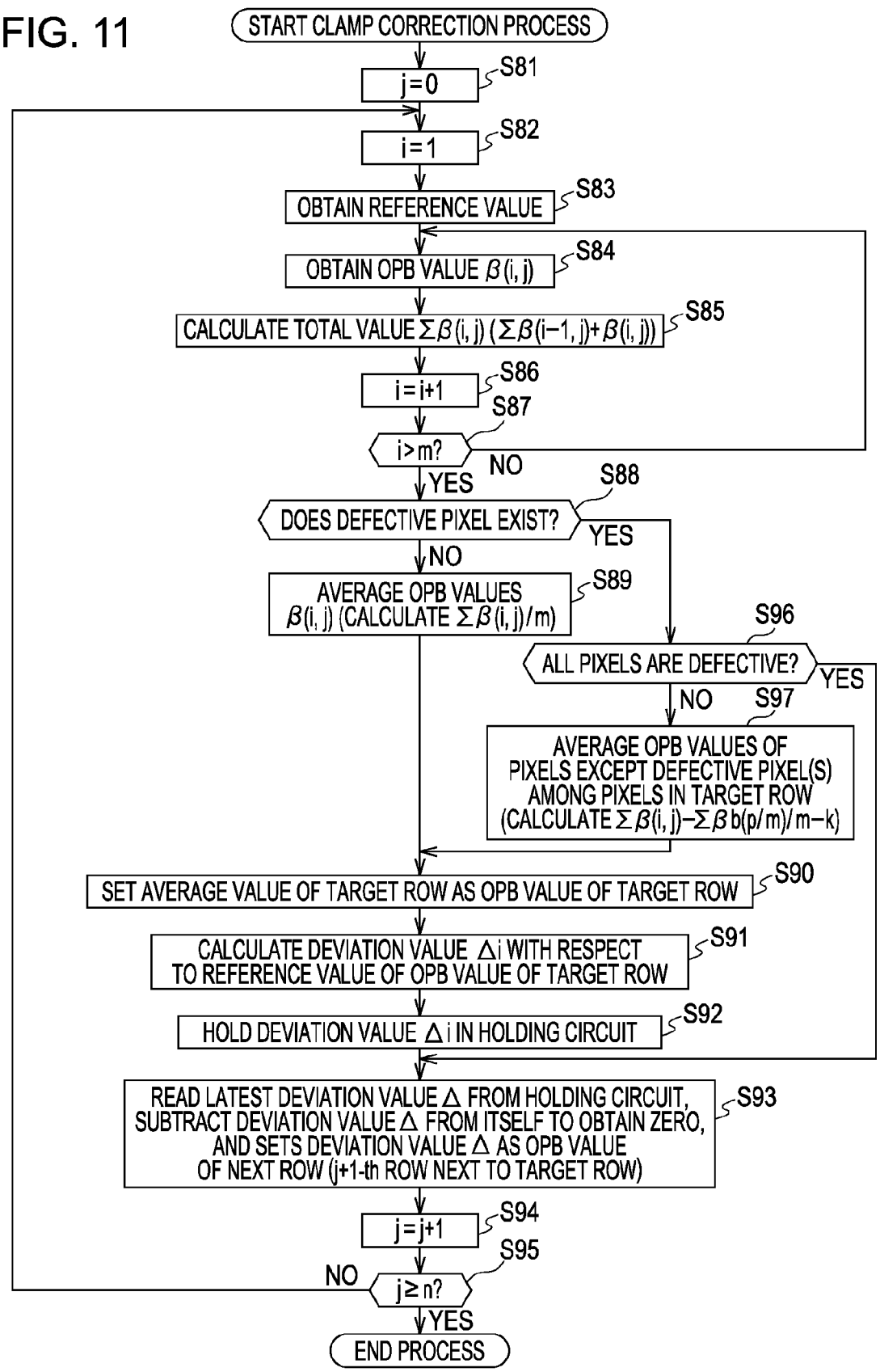
FIG. 11 is a flowchart illustrating an example of a clamp correction process to which the present invention is applied.

FIG. 11 is a flowchart illustrating an example of a process realized by an OPB clamp correction process method of the present invention, that is, the method corresponding to FIG. 6 or 7 and the method in a case where a point defect (defective pixel) exists (hereinafter referred to as clamp correction process).

In the example in FIG. 11, only the process related to the left horizontal OPB region 51L and the left effective pixel region 41L is illustrated. However, for the process related to the right horizontal OPB region 51R and the right effective pixel region 41R, only a change of the description "left" illustrated in FIG. 11 to "right" is necessary.

In step S81, the clamp correction unit 24 sets j=0. In step S82, the clamp correction unit 24 sets i=1. Here, i indicates a pixel position in the horizontal direction in a target row in the left horizontal OPB region 51L and indicates an integer value of 1 to m (m is an integer value of 2 or more). j indicates a row number of a target row in the left horizontal OPB region 51L and indicates an integer value of 0 to n−1 (n is an integer value of 1 or more).

In step S83, the clamp correction unit 24 obtains a reference value (e.g., zero).

In step S84, the clamp correction unit 24 obtains an OPB value $\beta(i, j)$ of a pixel $(i, j)$ in the left horizontal OPB region 51L.

In step S85, the clamp correction unit 24 calculates a total value $\Sigma\beta(i, j)$ ($\Sigma\beta(i-1, j)+\beta(i, j)$) of the pixel OPB in the left horizontal OPB region 51L.

In step S86, the clamp correction unit 24 increments i by 1 (i=i+1).

In step S87, the clamp correction unit 24 determines whether i>m.

If i is equal to or smaller than m, a NO determination is made in the process in step S87, the process returns to step S84, and the process thereafter is repeated.

That is, repetition of a loop process from step S84 to S87 causes the OPB values $\beta(i, j)$ (i is 1 to m) of the respective pixels $(i, j)$ included in a target row in the left horizontal OPB region 51L to be obtained and the total value $\Sigma\beta(i, j)$ (i is 1 to m) to be calculated. In addition, it is determined whether each pixel $(i, j)$ is a defective pixel in the loop process from step S84 to S87.

When i=m+1 is set in the process in step S86 after a final total value $\Sigma\beta(i, j)$ (i is 1 to m) has been calculated, i>m is satisfied. Accordingly, an YES determination is made in the process in the next step S87, and the process proceeds to step S88.

In step S88, the clamp correction unit 24 determines whether a defective pixel exists.

If no defective pixel exists in the target row (j-th row) in the left horizontal OPB region 51L, a NO determination is made in the process in step S88, and the process proceeds to step S89.

In step S89, the clamp correction unit 24 averages the OPB values β(i, j) (i is 1 to m) in the target row. That is, the clamp correction unit 24 calculates Σβ(i, j)/m.

In step S90, the clamp correction unit 24 sets an average value of the target row, that is, {Σβ(i, j)/m} in the present case where no defective pixel exists, as an OPB value of the target row.

In step S91, the clamp correction unit 24 calculates a difference value Δi with respect to the reference value (e.g., zero) of the OPB value of the target row.

In step S92, the clamp correction unit 24 holds the difference value Δi in the holding circuit. Alternatively, only the difference value Δi in a case where no defective pixel exists may be held as the process in step S92.

In step S93, the clamp correction unit 24 reads the latest difference value Δ (in the present case, the difference value Δi held in the preceding process in step S92) from the holding circuit, and sets the difference value Δ as the OPB value of the next row (j+1-th row, which is the row next to the target row) in the left effective pixel region 41L.

In step S94, the clamp correction unit 24 increments j by 1 (j=j+1).

In step S95, the clamp correction unit 24 determines whether j≧n.

If the process target row number j is less than n, the process returns to step S82, and the processes thereafter are repeated.

The description has been given above about a series of processes in a case where there is no defective pixel in the j-th target row in the left horizontal OPB region 51L.

On the other hand, in a case where there is a defective pixel in the j-th target row in the left horizontal OPB region 51L, the following series of processes are performed.

That is, in a case where a defective pixel exists in the target row (j-th row) in the left horizontal OPB region 51L, an YES determination is made in the process in step S88, and the process proceeds to step S96.

In step S96, the clamp correction unit 24 determines whether all the pixels in the target row (j-th row) in the left horizontal OPB region 51L are defective.

If one or some (not all) of the pixels in the target row (j-th row) in the left horizontal OPB region 51L are defective, a NO determination is made in step S96, and the process proceeds to step S97.

In step S97, the clamp correction unit 24 averages OPB values of pixels except the defective pixel(s) among the pixels included in the target row. That is, the clamp correction unit 24 calculates {Σβ(i, j)−Σβb(p/m)/m−k)}. Here, k indicates the number of defective pixels (k<m). Meanwhile, Σβb(p, j) indicates a total value of the OPB values βb (p, j) of the defective pixels (p is 1 to k). Then, the process proceeds to step S90.

In step S90, the clamp correction unit 24 sets the average value of the target row, that is, {Σβ(i, j)−Σβb(p, j)/m−k} in the present case where a defective pixel exists, as an OPB value of the target row.

In step S91, the clamp correction unit 24 calculates a difference value Δi with respect to the reference value (e.g., zero) of the OPB value of the target row.

In step S92, the clamp correction unit 24 holds the difference value Δi in the holding circuit. Alternatively, as described above, the process in step S92 may be omitted because a defective pixel exists in the present case.

In step S93, the clamp correction unit 24 reads the latest difference value Δ from the holding circuit, and sets the difference value Δ as the OPB value of the next row (j+1-th row, which is the row next to the target row) in the left effective pixel region 41L. In the present case, if step S92 is not omitted, the difference value Δi held in the preceding process in step S92 is the latest difference value Δ. On the other hand, if step S92 is omitted, the difference value Δi−q held in the process in step S92 when the row of the preceding number i−q (q is an integer value of 1 or more) with no defective pixel is a target row serves as the latest difference value Δ.

The description has been given above about a series of processes in a case where one or some of the pixels in the j-th target row in the left horizontal OPB region 51L are defective pixels.

On the other hand, in a case where all the pixels in the j-th target row in the left horizontal OPB region 51L are defective pixels, the following series of processes are performed.

That is, in a case where all the pixels in the target row (j-th row) in the left horizontal OPB region 51L are defective pixels, an YES determination is made in the process in step S96, and the process proceeds to step S93.

In step S93, the clamp correction unit 24 reads the latest difference value Δ from the holding circuit, and sets the difference value Δ as the OPB value of the next row (j+1-th row, which is the row next to the target row) in the left effective pixel region 41L. In the present case, the difference value Δi−q held in the process in step S92 when the row of the preceding number i−q (q is an integer value of 1 or more) with no defective pixel is a target row serves as the latest difference value Δ.

Additionally, as described above, FIG. 11 illustrates only the clamp correction process related to the left horizontal OPB region 51L and the left effective pixel region 41L. Therefore, note that the processes corresponding to steps S81 to S97 for the right horizontal OPB region 51R and the right effective pixel region 41R (processes in which "left" is replaced by "right") are executed before or after the processes of steps S81 to S97 for the left horizontal OPB region 51L and the left effective pixel region 41L for the j-th target row are executed.

Alternatively, in the process in step S92, two holding circuits may be provided, and all difference values Δi may be held in one of the holding circuits regardless of the presence/absence of a defective pixel, and difference values Δi may be held in the other holding circuit only when no defective pixel exists or when a defective pixel exists. That is, in this case, the latest difference value Δ is held in the other holding circuit.

Figure 12:
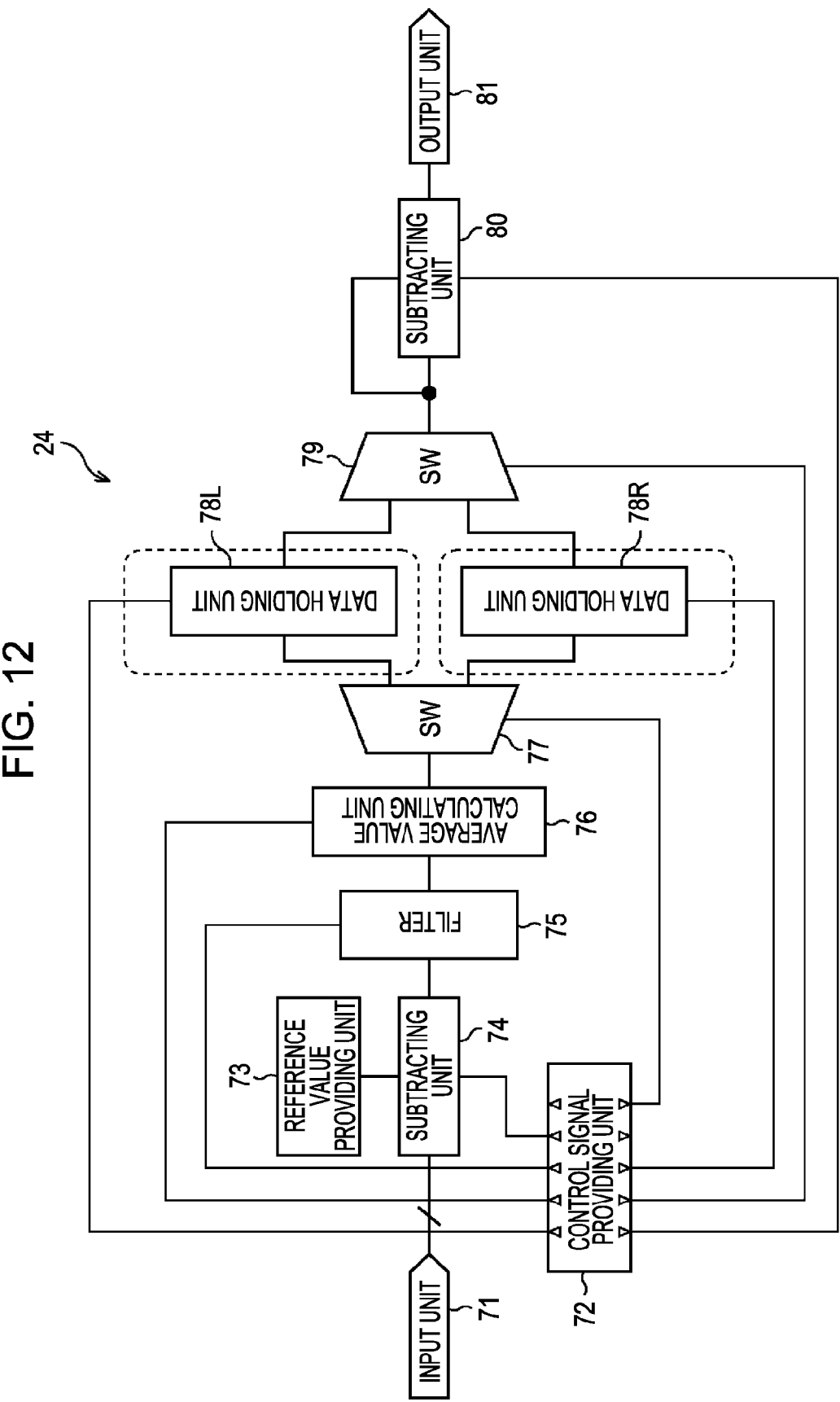
FIG. 12 is a diagram illustrating a configuration example of a clamp correction unit in FIG. 2.

FIG. 12 illustrates a configuration example of the clamp correction unit 24 based horizontal OPB related to FIGS. 2, 8, and 9.

The clamp correction unit 24 in the example in FIG. 12 is provided with one data input unit 71 and one data output unit 81. Also, the clamp correction unit 24 is provided with two subtracting units 74 and 80, switches 77 and 79, a filter 75, an average value calculating unit 76, a control signal providing unit 72, a reference value providing unit 73, and left and right data holding units 78L and 78R.

The switches 77 and 79 perform switch between input and output of left OPB data and right OPB data (difference value Δ of left and right). The filter 75 eliminates an abnormal value of a pixel signal in a row (target row) in the left horizontal OPB region 51L or the right horizontal OPB region 51R. That is, an OPB value of a defective pixel is eliminated. The average value calculating unit 76 calculates an average value of OPB values of normal pixels (to be exact, an average value of difference values Δ calculated by subtraction of the reference value from the reference value providing unit 73) in a target row in the left horizontal OPB region 51L or the right horizontal OPB region 51R. The data holding unit 78L holds OPB data in the left horizontal OPB region 51L (left difference value Δ). The data holding unit 78R holds OPB data in the right horizontal OPB region 51R (right difference value Δ). Incidentally, a holding amount of the data holding units 78L and 78R is not limited to the amount corresponding to a target row, and a result of the preceding row is also held, for example. The subtracting unit 74 subtracts the reference value provided from the reference value providing unit 73 from data input to the input unit 71 and outputs a result.

In the clamp correction unit 24 in the example in FIG. 12, the subtracting unit 74 subtracts the reference value from the values of left and right OPB pixels signals (OPB values) sequentially input by the input unit 71 at different times in time series. Among the respective values in the target row obtained thereby, an abnormal value (OPB value of a defective pixel) larger than a predetermined value is eliminated by the filter 75. An averaging process of pixel data (except an abnormal value) in a row (target row) in the left horizontal OPB region 51L or the right horizontal OPB region 51R is executed. In the output of the average value calculating unit 76, the OPB data of the left horizontal OPB region 51L (left difference value Δ) is held in the data holding unit 78L via the switch 77 on the basis of a control signal from the control signal providing unit 72. In the output of the average value calculating unit 76, the OPB data of the right horizontal OPB region 51R (right difference value Δ) is held in the data holding unit 78R via the switch 77 on the basis of a control signal from the control signal providing unit 72.

On the basis of a control signal from the control signal providing unit 72, the OPB data of the left horizontal OPB region 51L (left difference value Δ) is called from the data holding unit 78L and is input to the subtracting unit 80 via the switch 79. The value is input to the subtracting unit 80 again, the left difference value Δ is canceled to zero (subtract itself), and a subtraction result is output from the output unit 81 such that the subtraction result is constantly zero. Accordingly, a lower limit value of a black level for each row in the left effective pixel region 41L is set.

On the other hand, on the basis of a control signal from the control signal providing unit 72, the OPB data of the right horizontal OPB region 51R (right difference value Δ) is called from the data holding unit 78R and is input to the subtracting unit 80 via the switch 79. The value is input to the subtracting unit 80 again, the right difference value Δ is canceled to zero (subtract itself), and a subtraction result is output from the output unit 81 such that the subtraction result is constantly zero. Accordingly, a lower limit value of a black level for each row in the right effective pixel region 41R is set.

Such a series of processes are executed sequentially and repeatedly from j=0 to j=n on the left effective pixel region 41L and the right effective pixel region 41R, and then the clamp correction process ends.

The block (signal processing unit) illustrated in FIG. 12 is a unit where a correction process for the left effective pixel region 41L and the right effective pixel region 41R is executed. It is needless to say that this process is applied also to more effective pixel regions that are virtually defined.

Figure 13:
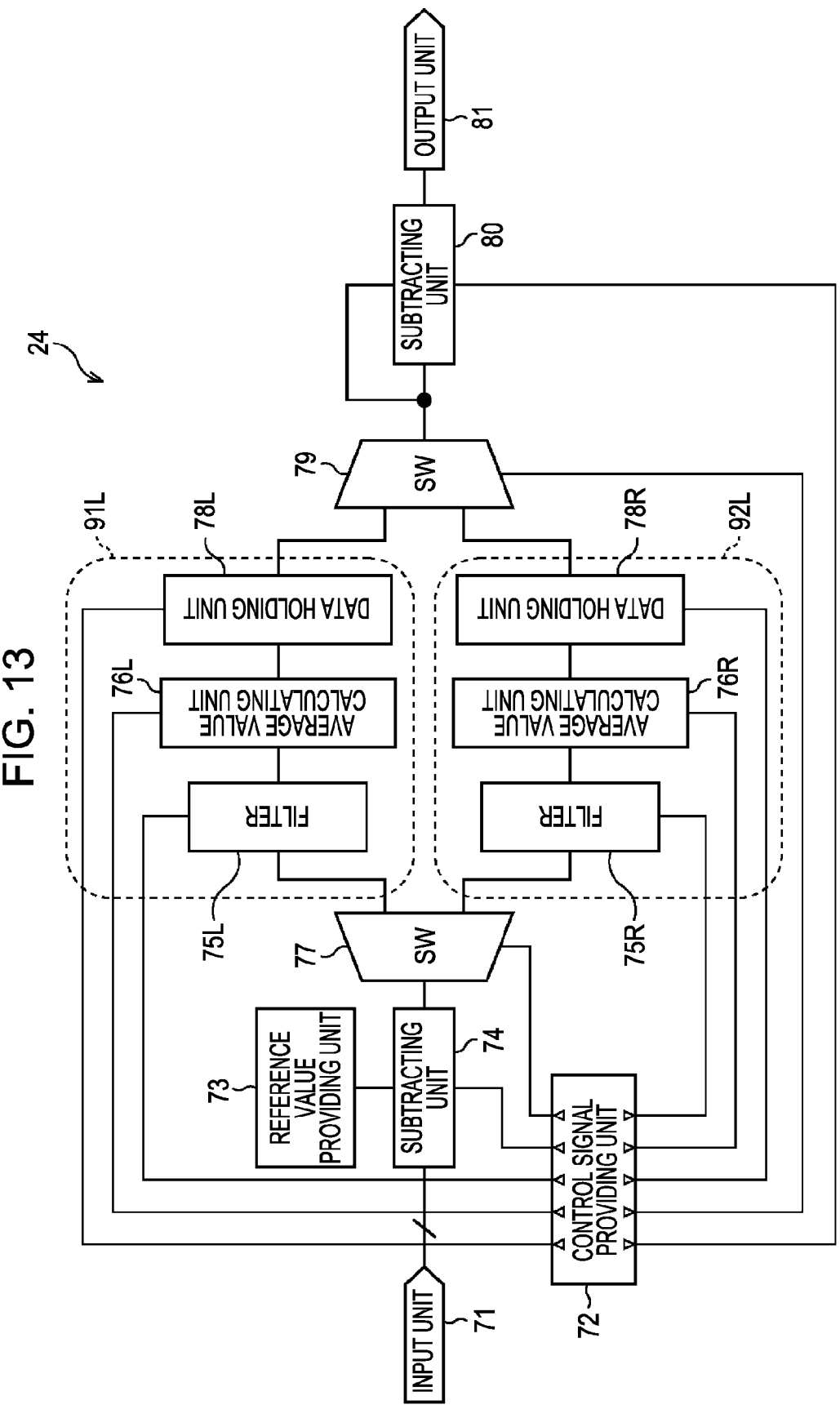
FIG. 13 is a diagram illustrating a configuration example of the clamp correction unit in FIG. 2, different from the example in FIG. 12.

FIG. 13 illustrates a configuration example of the clamp correction unit 24 based horizontal OPB related to FIGS. 2, and 10.

The clamp correction unit 24 in the example in FIG. 13 is provided with one data input unit 71 and one data output unit 81. Also, the clamp correction unit 24 is provided with two subtracting units 74 and 80, switches 77 and 79, left and right filters 75L and 75R, left and right average value calculating units 76L and 76R, a control signal providing unit 72, a reference value providing unit 73, and left and right data holding units 78L and 78R.

The switches 77 and 79 perform switch between input and output of left OPB data and right OPB data (difference value Δ of left and right).

The filter 75L eliminates an abnormal value of a pixel signal in a row (target row) in the left horizontal OPB region 51L. That is, an OPB value of a defective pixel is eliminated. The average value calculating unit 76L calculates an average value of OPB values of normal pixels (to be exact, an average value of difference values Δ calculated by subtraction of the reference value from the reference value providing unit 73) in a target row in the left horizontal OPB region 51L. The data holding unit 78L holds OPB data in the left horizontal OPB region 51L (left difference value Δ). Incidentally, a holding amount of the data holding unit 78L is not limited to the amount corresponding to a target row, and a result of the preceding row is also held, for example.

The filter 75R eliminates an abnormal value of a pixel signal in a row (target row) in the right horizontal OPB region 51R. That is, an OPB value of a defective pixel is eliminated. The average value calculating unit 76R calculates an average value of OPB values of normal pixels (to be exact, an average value of difference values Δ calculated by subtraction of the reference value from the reference value providing unit 73) in a target row in the right horizontal OPB region 51R. The data holding unit 78R holds OPB data in the right horizontal OPB region 51R (right difference value Δ). Incidentally, a holding amount of the data holding unit 78R is not limited to the amount corresponding to a target row, and a result of the preceding row is also held, for example.

The subtracting unit 74 subtracts the reference value provided from the reference value providing unit 73 from data input to the input unit 71 and outputs a result. The subtracting unit 80 subtracts the output value itself of the switch 79 and outputs zero.

In the clamp correction unit 24 in the example in FIG. 13, the subtracting unit 74 subtracts the reference value from the values of left and right OPB pixels signals (OPB values) sequentially input by the input unit 71 at different times in time series. Among the respective values in the target row obtained thereby, the respective values for the left horizontal OPB region 51L are input to the filter 75L on the basis of a control signal from the control signal providing unit 72. An abnormal value (OPB value of a defective pixel) larger than a predetermined value is eliminated by the filter 75L. An averaging process of pixel data (except an abnormal value) in a row (target row) in the left horizontal OPB region 51L is executed. In the output of the average value calculating unit 76L, the OPB data of the left horizontal OPB region 51L (left difference value Δ) is held in the data holding unit 78L. On the basis of a control signal from the control signal providing unit 72, the OPB data of the left horizontal OPB region 51L (left difference value Δ) is called from the data holding unit 78L and is input to the subtracting unit 80 via the switch 79. The value is input to the subtracting unit 80 again, the left difference value Δ is canceled to zero (subtract itself), and a subtraction result is output from the output unit 81 such that the subtraction result is constantly zero. Accordingly, a lower limit value of a black level for each row in the left effective pixel region 41L is set.

On the other hand, in the output of the subtracting unit 74, the respective values for the right horizontal OPB region 51R are input to the filter 75R on the basis of a control signal from the control signal providing unit 72. An abnormal value (OPB value of a defective pixel) larger than a predetermined value is eliminated by the filter 75R. An averaging process of pixel data (except an abnormal value) in a row (target row) in the right horizontal OPB region 51R is executed. In the output of the average value calculating unit 76R, the OPB data of the right horizontal OPB region 51R (right difference value Δ) is held in the data holding unit 78R. On the basis of a control signal from the control signal providing unit 72, the OPB data of the right horizontal OPB region 51R (right difference value Δ) is called from the data holding unit 78R and is input to the subtracting unit 80 via the switch 79. The value is input to the subtracting unit 80 again, the right difference value Δ is canceled to zero (subtract itself), and a subtraction result is output from the output unit 81 such that the subtraction result is constantly zero. Accordingly, a lower limit value of a black level for each row in the right effective pixel region 41R is set.

That is, the clamp correction unit 24 in the example in FIG. 13 is provided with a left horizontal OPB data processing unit 91L including the filter 75L, the average value calculating unit 76L, and the data holding unit 78L, and a right horizontal OPB data processing unit 91R including the filter 75R, the average value calculating unit 76R, and the data holding unit 78R. The switches 77 and 79 are switched on the basis of a control signal from the control signal providing unit 72. As a result, a left difference value Δ from the left horizontal OPB data processing unit 91L (OPB data of the left horizontal OPB region 51L) and a right difference value Δ from the right horizontal OPB data processing unit 91R (OPB data of the right horizontal OPB region 51R) are alternately output and are input to the subtracting unit 80. The operation of the subtracting unit 80 is as described above.

Such a series of processes are executed sequentially and repeatedly from j=0 to j=n on the left effective pixel region 41L and the right effective pixel region 41R, and then the clamp correction process ends.

The block (signal processing unit) illustrated in FIG. 13 is a unit where a correction process for the left effective pixel region 41L and the right effective pixel region 41R is executed. It is needless to say that this process is applied also to more effective pixel regions that are virtually defined.

Figure 14:
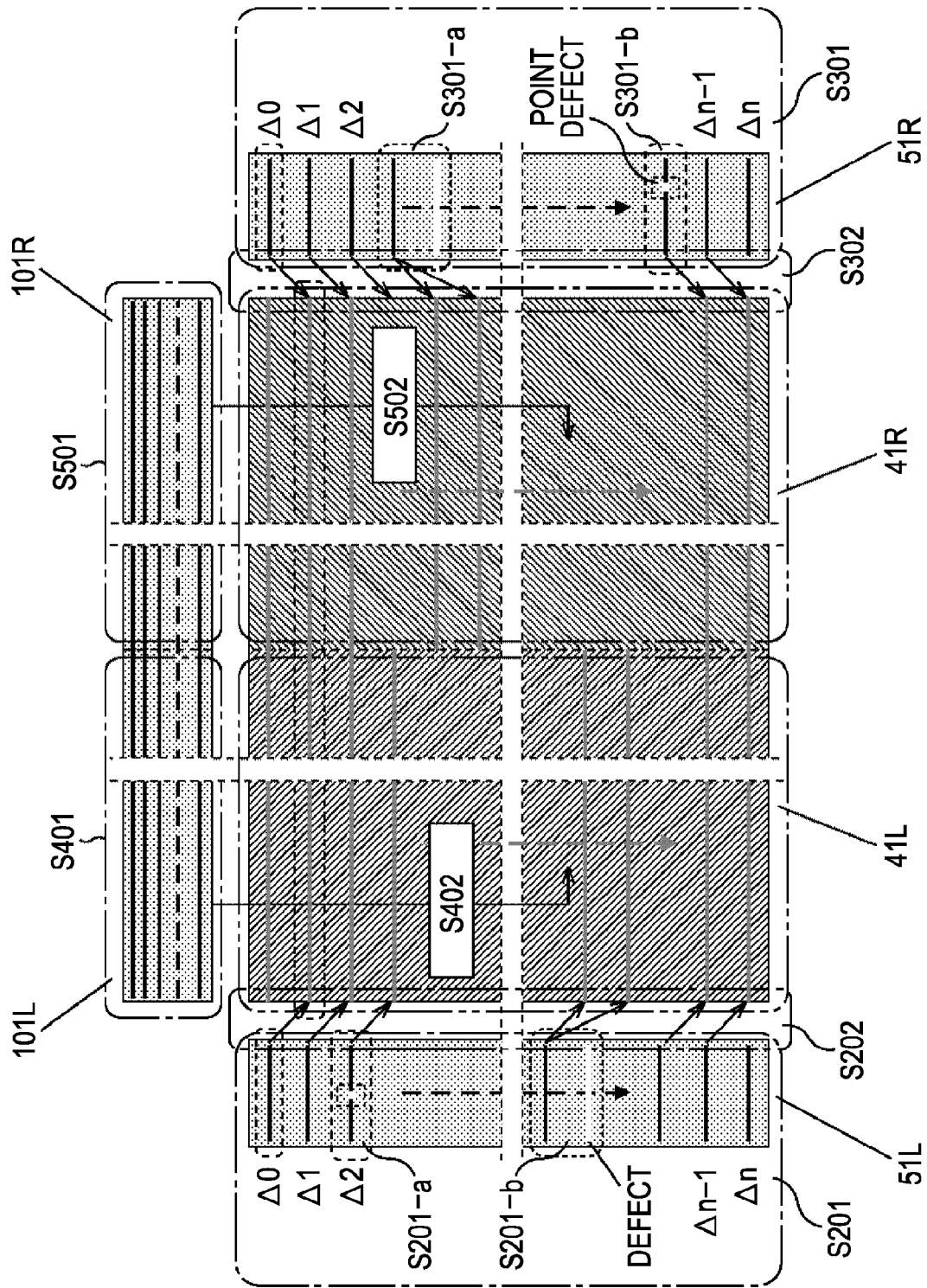
FIG. 14 is a diagram illustrating an operation of example 2 in a case of adopting an example of a vertical/horizontal-combined left/right-independent OPB clamp control method as example 2 of the present invention.

FIG. 14 is a diagram illustrating an operation of example 2 in a case where an example of a vertical/horizontal-combined left/right-independent OPB clamp control method is adopted as example 2 of the present invention.

In the photoelectric conversion pixel unit 11 of the example in FIG. 14, the effective pixel region 41 is divided into the left effective pixel region 41L and the right effective pixel region 41R. Furthermore, in the clamp correction for the left effective pixel region 41L, a left vertical OPB region 101L functions for a process at rough adjustment whereas the left horizontal OPB region 51L functions for a process at fine adjustment. Likewise, in the clamp correction for the right effective pixel region 41R, a right vertical OPB region 101R functions for a process at rough adjustment whereas the right horizontal OPB region 51R functions for a process at fine adjustment.

At rough adjustment in the clamp correction for the left effective pixel region 41L, processes in steps S401 and S402 are executed.

In step S401, the clamp correction unit 24 executes a process of averaging OPB values of all the pixels included in the left vertical OPB region 101L, that is, an averaging process. The clamp correction unit 24 sets the average value as an OPB value of the left vertical OPB region 101L and obtains a difference value Δ with respect to a reference value (e.g., zero) of the OPB value of the left vertical OPB region 101L.

In step S402, the clamp correction unit 24 sets the difference value Δ as an OPB value of the whole pixels in the left effective pixel region 41L.

At fine adjustment in the clamp correction for the left effective pixel region 41L, processes in steps S201 (step S201-a or S201-b as necessary) and S202 are executed. The processes in steps S201 (step S201-a or S201-b as necessary) and S202 are basically the same as the processes in steps S31 (step S31-a or S31-b as necessary) and S32 in FIG. 6 or the processes in steps S51 (step S51-a or S51-b as necessary) and S52 in FIG. 7.

On the other hand, at rough adjustment in the clamp correction for the right effective pixel region 41R, processes in steps S501 and S502 are executed.

In step S501, the clamp correction unit 24 executes a process of averaging OPB values of all the pixels included in the right vertical OPB region 101R, that is, an averaging process. The clamp correction unit 24 sets the average value as an OPB value of the right vertical OPB region 101R and obtains a difference value Δ with respect to a reference value (e.g., zero) of the OPB value of the right vertical OPB region 101R.

In step S402, the clamp correction unit 24 sets the difference value Δ as an OPB value of the whole pixels in the right effective pixel region 41R.

At fine adjustment in the clamp correction for the right effective pixel region 41R, processes in steps S301 (step S301-a or S301-b as necessary) and S302 are executed. The processes in steps S301 (step S301-a or S301-b as necessary) and S302 are basically the same as the processes in steps S41 (step S41-a or S41-b as necessary) and S42 in FIG. 6 or the processes in steps S61 (step S61-a or S61-b as necessary) and S62 in FIG. 7.

Figure 15:
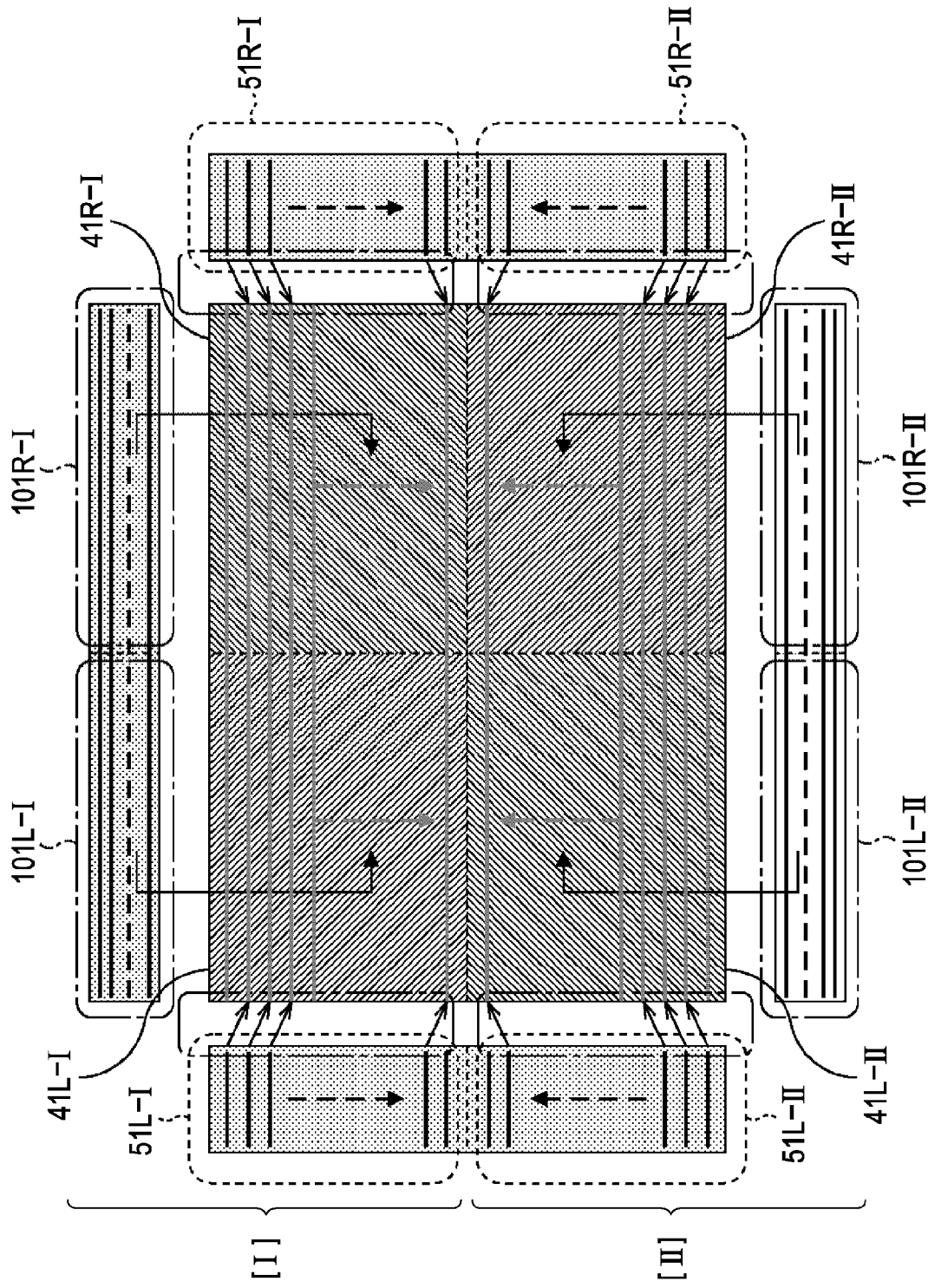
FIG. 15 is a diagram illustrating an operation of example 3 in a case of adopting an example of a left/right/upper/lower four-region ½ upper/lower reading left/right-independent OPB clamp control method as example 3 of the present invention.

FIG. 15 is a diagram illustrating an operation of example 3 in a case where an example of a left/right/upper/lower four-region 1/2 upper/lower reading left/right-independent OPB clamp control method is adopted as example 3 of the present invention.

The photoelectric conversion pixel unit 11 of the example in FIG. 15 is divided into an upper region [I] and a lower region [II], and each of the regions [I] and [II] has the same configuration as that in FIG. 14.

That is, in the photoelectric conversion pixel unit 11 of the example in FIG. 15, the region [I] of the effective pixel region 41 is divided into a left effective pixel region 41L-I and a right effective pixel region 41R-I. Furthermore, in the clamp correction for the left effective pixel region 41L-I, a left vertical OPB region 101L-I functions for a process at rough adjustment whereas a left horizontal OPB region 51L-I functions for a process at fine adjustment. Likewise, in the clamp correction for the right effective pixel region 41R-I, a right vertical OPB region 101R-I functions for a process at rough adjustment whereas a right horizontal OPB region 51R-I functions for a process at fine adjustment.

Also, the region [II] of the effective pixel region 41 is divided into a left effective pixel region 41L-II and a right effective pixel region 41R-II. Furthermore, in the clamp correction for the left effective pixel region 41L-II, a left vertical OPB region 101L-II functions for a process at rough adjustment whereas a left horizontal OPB region 51L-II functions for a process at fine adjustment. Likewise, in the clamp correction for the right effective pixel region 41R-II, a right vertical OPB region 101R-II functions for a process at rough adjustment whereas a right horizontal OPB region 51R-II functions for a process at fine adjustment.

That is, a process same as the clamp correction process described with reference to FIG. 14 is performed on each of the regions [I] and [II].

As described above, in example 3 in F*ig*. 15, OPB clamp correction can be performed on the CMOS image sensor having the effective pixel region 41 that is larger than in examples 1 and 2. The effective pixel region 41 is divided into four upper/lower/left/right regions. In order to execute OPB clamp correction (clamp correction process) independently for each of the regions, the respective OPB regions are placed for the upper/lower/left/right regions of the effective pixel region 41.

The left vertical OPB region 101L-I, the right vertical OPB region 101R-I, the left horizontal OPB region 51L-I, and the right horizontal OPB region 51R-I perform the same correction as the OPB clamp correction (clamp correction process) described with reference to FIG. 14 on the respective columns and respective rows in the lower-left and lower-right effective pixel regions 41L-I and 41R-I. Also, the left vertical OPB region 101L-II, the right vertical OPB region 101R-II, the left horizontal OPB region 51L-II, and the right horizontal OPB region 51R-II perform the same correction as the OPB clamp correction (clamp correction process) described with reference to FIG. 14 on the respective columns and respective rows in the upper-left and upper-right effective pixel regions 41L-II and 41R-II.

The present invention described above can produce the following first to fifth advantages.

In the left/right-independent clamp correction method, the number of row pixels in the horizontal OPB regions placed on the left and right is quite smaller than the number of row pixels in the effective pixel region. For this reason, even when a defective pixel exists, an averaging process of OPB values of row pixels in the horizontal OPB regions can be completed by next row scanning. Thus, an OPB correction process in units of rows can be performed. In addition, clamp correction can be performed without executing an operating process on respective pixel signals in the effective pixel region unlike in the CCD image sensor, so that the clamp correction can be executed with high precision in a short time. The above-described advantage is the first advantage.

The second advantage is an advantage that offset control can be executed independently for the left and right by using both rough adjustment and fine adjustment.

The third advantage is an advantage that outputting signals from the effective pixel region need not be performed through multiple channels (two or more outputs) and only a single channel is necessary, which simplifies an entire circuit configuration.

The fourth advantage is an advantage that signal processing such as an OPB value averaging process is simplified by changing a scanning order so that an OPB region is scanned before a corresponding effective pixel region.

The fifth advantage is an advantage that offset correction can be performed independently for respective effective pixel regions by defining four virtual regions in an image sensor (70 mm for movies) having an effective pixel region of a larger area with further development of the above-described thoughts.

Incidentally, a solid-state imaging device (image sensor) to which the present invention is applied is applicable to a camera portion of various electronic apparatuses having a shooting function. Examples of the electronic apparatuses include a digital still camera, a digital video camera, a notebook personal computer, and a mobile phone. The solid-state imaging device to which the present invention is applied to a camera portion of electronic apparatuses in various fields for capturing images or videos in those electronic apparatuses. Hereinafter, examples of electronic apparatuses to which such a camera is applied are described.

For example, the present invention is applicable to a digital still camera, which is an example of an electronic apparatus. This digital still camera is manufactured to include a solid-state imaging device to which the present invention is applied in addition to an image capturing lens, a display unit, a control switch, a menu switch, a shutter, and the like.

For example, the present invention is applicable to a notebook personal computer, which is an example of an electronic apparatus. In this notebook personal computer, a main body thereof includes a keyboard operated to input characters and the like, and a main body cover thereof includes a camera portion. This notebook personal computer is manufactured by using the solid-state imaging device to which the present invention is applied in the camera portion.

For example the present invention is applicable to a mobile terminal apparatus, which is an example of an electronic apparatus. This mobile terminal apparatus includes an upper casing and a lower casing. Statuses of the mobile terminal apparatus include an open status and a closed status of those two casings. This mobile terminal apparatus includes a connecting portion (hinge portion here), a display, a sub-display, a picture light, a camera portion, and the like in addition to the above-described upper casing and lower casing, and is manufactured by using the solid-state imaging device to which the present invention is applied in the camera portion.

For example, the present invention is applicable to a digital video camera, which is an example of an electronic apparatus. The digital video camera is manufactured to include the solid-state imaging device to which the present invention is applied in addition to a main body portion, a subject shooting lens on a front-directed side surface, a shooting start/stop switch, and a monitor.

An embodiment of the present invention is not limited to the above-described embodiment, and various changes are acceptable without deviating from the gist of the present invention.

The invention claimed is:

1. A clamp control method by a clamp circuit for left/right-independent optical black horizontal clamp control, the method comprising:
 providing horizontal optical black regions to the left and right of an entire effective pixel region of a CMOS image sensor of a column-parallel analog-digital conversion method having two left and right regions, the horizontal optical black regions being a left optical black region and a right optical black region;
 executing a horizontal clamp process independently for the left and right on virtually-defined left and right effective pixel regions by using optical black; and
 executing a horizontal clamp process using the right optical black region on the right effective pixel region,
 wherein,
 (a) the left/right-independent optical black horizontal clamp control includes sequentially performing processes of
  (1) setting a deviation from a reference value of a lower limit value of a black level of pixels constituting a row as an optical black value of pixels in each of the left and right optical black regions, (2) calculating a sum of optical black values in each row, (3) holding a value averaged by the number of pixels in a row as an optical black value of the row until scanning of a next row, (4) calling this value at scanning of a row in the effective pixel region to perform operation clamp, and (5) applying the value as a lower limit value of a black level of a next row in the effective pixel region; and (b) performing a clamp process on all rows in the left and right effective pixel regions by associating the left effective pixel region with the left optical black region and associating the right effective pixel region with the right optical black region.

2. The clamp control method according to claim 1, wherein the clamp circuit includes:
one input unit after the column-parallel analog-digital conversion,
at least two or more signal processing units,
one output unit, and
a horizontal clamp process using the left optical black region applied to the left effective pixel region.

3. The clamp control method according to claim 1, wherein, in each row in the left and right optical black regions, when the deviation from the reference value of the lower limit value of the black level of the pixels constituting the row has an abnormal value in a process of calculating an optical black average value, a value calculated by dividing a sum of optical black values except the abnormal value by the number of pixels calculated by subtracting the number of pixels having the abnormal value from a total number of pixels in a row is set as an average value, the average value set as an optical black value of the row.

4. The clamp control method according to claim 3, wherein, in each row in the left and right optical black regions, when all pixels constituting a row have the abnormal value in the process of calculating the optical black average value, (i) the row is not used in the clamp process of the corresponding effective pixel region and (ii) the clamp process is executed using an optical black value of a preceding row having a latest normal value.

5. The clamp control method according to claim 1, wherein a horizontal scanning order of the left/right-independent optical black horizontal clamp control is:
an order of the left optical black region, the left effective pixel region, the right effective pixel region, and the right optical black region,
an order of the left optical black region, the right optical black region, the left effective pixel region, and the right effective pixel region, or
an order of the left optical black region, the left effective pixel region, the right optical region, and the right effective pixel region.

6. A clamp control method by a clamp circuit for left/right-independent optical black horizontal clamp control, the method comprising:
providing horizontal optical black regions to the left and right of an entire effective pixel region of a CMOS image sensor of a column-parallel analog-digital conversion method having two left and right regions, the horizontal optical black regions being a left optical black region and a right optical black region;
executing a horizontal clamp process independently for the left and right on virtually-defined left and right effective pixel regions by using optical black; and
executing a horizontal clamp process using the right optical black region on the right effective pixel region,
wherein vertical/horizontal-combined left/right-independent optical black clamp control includes,
providing optical black regions above and to the left and right of the entire effective pixel region in the effective pixel region having two left and right regions, the upper optical black region being a vertical optical black region for executing a rough clamp process, the upper optical black region being divided into a left vertical optical black region and a right vertical optical black region, and in each of the vertical optical black regions, and
setting an average value calculated by dividing a sum of optical black values in the region by the number of all pixels in the optical black region as an optical black value of each of the left and right optical black regions, and in addition, in the horizontal optical black regions placed to the left and right of the entire effective pixel region, executing a fine clamp process on the left and right effective pixel regions by the left/right-independent optical black horizontal clamp control.

7. The clamp control method according to claim 6,
wherein virtual four-region ½upper/lower reading vertical/horizontal-combined left/right-independent optical black clamp control includes,
providing upper-left and upper-right vertical optical black regions and upper-left and upper-right horizontal optical black regions for upper-left and upper-right effective pixel regions in the effective pixel region including four upper-left, upper-right, lower-left, and lower-right regions,
executing a rough clamp process by using the upper-left vertical optical black region and executing a fine clamp process from top to bottom and from left to right by using the upper-left horizontal optical black region on the upper-left effective pixel region, and executing a rough clamp process by using the upper-right vertical optical black region and executing a fine clamp process from top to bottom and from left to right by using the upper-right horizontal optical black region on the upper-right effective pixel region, and
executing a rough clamp process by using a lower-left vertical optical black region and executing a fine clamp process from bottom to top and from left to right by using a lower-left horizontal optical black region on the lower-left effective pixel region, and executing a rough clamp process by using a lower-right vertical optical black region and executing a fine clamp process from bottom to top and from left to right by using a lower-right horizontal optical black region on the lower-right effective pixel region.

8. A clamp correction device comprising:
one data input unit;
one data output unit;
a first filter;
a first average value calculating circuit;
a data holding circuit including at least a left data holding circuit and a right holding circuit;
a first and a second switches; and
first and second subtracting circuits,
wherein a reference value is subtracted by the first subtracting circuit from pixel signals in an optical black region input by the data input unit in time series, data input to the first switch unit is divided in accordance with a control signal, process data related to a left optical black region is held in the left data holding circuit, and process data related to a right optical black region is held in the right data holding circuit, wherein the process data is read at different times as necessary at predetermined time intervals in accordance with a control signal, and wherein the values are sequentially output through the second switch, are processed by the second subtracting circuit to subtract the data value itself, and are output as zero from the data output unit.

9. An image sensor in which the clamp correction device according to claim 8 is placed on a same chip together with a pixel region and an analog-digital converter.

10. An electronic apparatus in which the image sensor according to claim 9 is mounted.

* * * * *